US009633226B2

(12) United States Patent
Holland et al.

(10) Patent No.: US 9,633,226 B2
(45) Date of Patent: Apr. 25, 2017

(54) SYSTEMS AND METHODS FOR MANAGING AUTHORITY DESIGNATION AND EVENT HANDLING FOR HIERARCHICAL GRAPHICAL USER INTERFACES

(71) Applicant: Apple Inc., Cupertino, CA (US)

(72) Inventors: Philip J. Holland, Ypsilanti, MI (US); Chendi Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 14/292,758

(22) Filed: May 30, 2014

(65) Prior Publication Data

US 2015/0346970 A1 Dec. 3, 2015

(51) Int. Cl.
*G06F 21/62* (2013.01)
*G06F 9/44* (2006.01)
*G06F 3/0484* (2013.01)

(52) U.S. Cl.
CPC .............. *G06F 21/629* (2013.01); *G06F 9/44* (2013.01); *G06F 21/6281* (2013.01); *G06F 3/04842* (2013.01); *G06F 3/04845* (2013.01)

(58) Field of Classification Search
CPC .......... G06F 21/629; G06F 9/44; G06F 3/048; G06F 3/04842; G06F 3/04845
See application file for complete search history.

(56) References Cited

U.S. PATENT DOCUMENTS 5,517,605 A 5/1996 Wolf
6,801,224 B1 10/2004 Lewallen
8,365,192 B2 * 1/2013 Holland ................. G06F 3/048 719/313
8,675,000 B2 3/2014 Labour
8,752,070 B2 * 6/2014 Holland ................. G06F 3/048 719/313
9,003,427 B2 * 4/2015 Holland ................. G06F 3/048 719/313
2005/0024328 A1 * 2/2005 Oldfield ............. G06F 3/04886 345/157
2006/0095245 A1 * 5/2006 Von Ruff .............. G06F 1/1626 703/21
2012/0185872 A1 * 7/2012 Holland ................. G06F 3/048 719/313

(Continued)

*Primary Examiner* — Jing-Yih Shyu
(74) *Attorney, Agent, or Firm* — Blank Rome LLP

(57) ABSTRACT

Prior art attempts to manage authority designation in GUI-based computer systems have set up various "handshaking" schemes between a graphics management system, such as a window server, and the various processes that are attempting to offer and accept access to each other. However, these schemes have certain limitations. In particular, when windows are used as the "fundamental basis" for implementing authority designation, events that should treat all content within a window identically can't do so because, even though all content in the window may appear to be "owned" by the window, there may be some other process that is actually rendering the content to some portion of the window. Thus, described herein are systems and methods to manage authority designation and event handling within "hierarchical" GUIs using "handshaking" schemes that are secure, sub-window granular, and that generalize recursively when applied to the various graphical layers used to construct the windows.

20 Claims, 13 Drawing Sheets

(56) References Cited

U.S. PATENT DOCUMENTS

| | | | |
|---|---|---|---|
| 2012/0284630 A1 | 11/2012 | May | |
| 2012/0297333 A1* | 11/2012 | Gnech | G06F 3/038 715/781 |
| 2014/0075555 A1* | 3/2014 | Shilimkar | G06F 21/566 726/23 |
| 2014/0331145 A1* | 11/2014 | Schoenefeld | G06F 8/38 715/740 |

* cited by examiner

SYSTEMS AND METHODS FOR MANAGING AUTHORITY DESIGNATION AND EVENT HANDLING FOR HIERARCHICAL GRAPHICAL USER INTERFACES

FIELD OF THE INVENTION

Embodiments of the invention relate generally to the field of secure computing; and more particularly, to managing access of graphical user interface (GUI) elements and responding to events in a hierarchical graphical user interface environment.

BACKGROUND

Security concerns for all types of processor-based electronic devices, and particularly for computing devices, have become significant. While some concerns may relate to detrimental actions which may be undertaken by defective code implemented by such devices, the greater concerns relate to the ramifications of various types of attacks made upon such devices through malicious code, including code conventionally known in the field by a number of names, such as "viruses," "worms," "Trojan horses," "spyware," "malware," and others. Many of these attacks are directed at computing devices, such as workstations, servers, desktop computers, notebook and handheld computers, and other similar devices. Many of these computing devices can run one or more application programs, which a user may operate to perform any number of desired functions.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code.

Most modern computer systems employ operating systems that support graphical user interfaces, or, "GUIs". Central to these operating systems is the use of a low-level application referred to as a "window server." One function of a window server is to receive, annotate and route signals from external devices (e.g., human interface devices such as keyboards, pointer devices and tablets) to the appropriate application (e.g., an audio, video or multimedia application). Typically, the window server manages all windows accessed by programs running within a data processing system, including granting accesses to the programs. As more and more programs are running in the system and more and more GUIs are utilized by the programs, the process for granting and managing the access of GUIs becomes more complicated and inefficient.

Prior art attempts to manage authority designation in GUI-based computer systems, such as those described in U.S. Pat. No. 8,365,192, published Jan. 29, 2013and entitled "Methods for Managing Authority Designation of Graphical User Interfaces," which is hereby incorporated by reference as if reproduced in its entirety, have attempted to set up "handshaking" schemes between a graphics management system, such as a window server, and the various processes that are attempting to offer and accept access to and from one another. However, these schemes have certain limitations. In particular, because windows were used as the "fundamental basis" of implementing authority designation in such window server-based management schemes, actions that should have treated all content and/or state spanning multiple windows in a self-consistent interface couldn't do so because, if there was an out-of-process window being presented as part of what the user thought was his or her application, there would potentially be lag in communication when certain user changes had to be rectified.

For example, in the case of a user request to resize a window, normally, an application would respond to the resize request in a very controlled manner, so that the user is not shown a half-drawn window (i.e., so as to avoid the phenomenon known as "window tearing"). This could be achieved by, e.g., recognizing the window resize up to a certain point, redrawing everything in the window, flushing that content to the screen, and then, if the window has been resized further since the screen flush, realizing the new resize request so that, when the window content reflows to the screen, it feels fluid and tearing is avoided. However, if the window being resized is "pretending" that some particular content is part of itself (e.g., by relying on position and sizing of content in a higher (z-order) window), but some other process is actually rendering that particular content, then the window can reflow all of its content, but it won't all necessarily update in the same time frame—resulting in windows that appear to be lagging behind and bouncing along as the user dragged or resized a different window.

Another limitation with prior art attempts to manage authority designation in GUI-based computer systems that use windows as their fundamental basis is the fact that the "service window" (i.e., the window that is being hosted into the application) cannot turn around and "re-grant" the hosting application permissions. For example, if the service process needed to ask for help to perform a particular task, it couldn't allow a second service to present a window as the host application, even if the intended use were to simply place another window over the service-provided content because it couldn't grant rights on behalf of a process that it wasn't. Thus, this form of authority management could not be applied recursively while maintaining security.

Thus, there is a need for systems and methods to manage authority designation and event handling among isolated, designated actors within hierarchical GUIs that are both secure and that generalize recursively when applied to the various graphical layers used to construct the windows within the hierarchical GUIs. There is also a need for simple rules that provide per-window granularity regarding content ownership and access, as well as the associated processes for managing them.

SUMMARY

According to some embodiments disclosed herein, rather than hosting content as windows, content is hosted in graphics contexts, such as CORE ANIMATION® contexts. (CORE ANIMATION® is a registered trademark of Apple Inc.) CORE ANIMATION® is a graphics rendering and animation infrastructure available on both APPLE'S iOS and OS X that developers may use to animate the views and other visual elements of their applications. By hosting content in CORE ANIMATION® contexts—rather than in windows—the level at which the "handshaking" occurs is entirely within CORE ANIMATION®. So, an application may request of a particular service, "Create a context that I can host to do something." Then, CORE ANIMATION® will create the requested context as what will be referred to herein as a "window server hosted context."

A "window server hosted context," as used herein, refers to a GUI element, wherein the rendering doesn't happen in the client process space; rather, it happens in the window server. This means that, any time a particular window needs to do a redraw, it has to synchronize the two (or more) processes, i.e., the host and the service, that would be being redrawn. So, with the systems described herein utilizing window server hosted contexts, the window manager is dealing with pre-synchronized data because the CORE ANIMATION® content is committed in transactions and will always have the last committed transaction available to draw.

The "handshaking" process that is done according to embodiments described herein stores a record of what contexts are allowed to host which content remotely, so that, when CORE ANIMATION® attempts to perform the requested rendering, it can determine whether the "current" context, i.e. the context that is currently drawing, is owned by the hosting process and whether it is expecting the hosted process. Thus, the window server will look at the two context records in its records database and verify whether the requested context was the correct context and whether it was requested by the correct hosting context. As may now be more fully understood, this process may be generalized and applied recursively to additional hierarchical layers of GUI elements hosted inside one another within windows.

For example, according to some embodiments of the improved windows management systems described herein, a given window no longer needs to request to the window server: "I'm going to present as this 'user-level' application." Instead, the context for window can simply report to the window server that: "I'm hosting context X" (i.e., a referencing layer), and context X will contain validating data (indicating that the window context is allowed to host it). So, for example, if Host Application A requests information to be put into a region of a window that will behave as a dialog box, e.g., Save Dialog B, but it also needs to provide thumbnail images C that the Save Dialog B service wouldn't know how to draw, then the process providing the Save Dialog B would want to host an additional remote context that could generate that data. At this point, a three-tiered hierarchical GUI structure will have been created, wherein a window in a hosting application (e.g., Host Application A) has some content that is remote to it (e.g., Save Dialog B) and—unknown to the host—within that remote context, there's some other content that's remote (e.g., thumbnail images C).

In the Save Dialog example described above, the high-level window is owned by Host Application A; the "first-level" remote content is Save Dialog B; and the detail information is from thumbnail image context C. In this example, contexts B and C will have done their "handshaking" independently of application A. In fact, application A never even needed to know about the handshaking between contexts B and C. However, within the window server, the "event system" (i.e., the system-level process that receives incoming user-level events and routes them to the correct windows/contexts for handling) does have to know about the handshaking between B and C so that, when everything in Host Application A get drawn, the graphic rendering infrastructure, e.g., CORE ANIMATION®, that does the drawing and figures out where the various graphical elements are located may hand a series of shapes representing the various graphical contexts in the window's hierarchy over to the event system. These shapes passed to the event system may have information attached to them that specifies the equivalent of: "This context routes to this process and has this shape on a given window." Further included in this information handed over to the event system may be a "tree height" property, i.e., a z-ordering of 'what contains what,' with respect to the hierarchical window that is being rendered. The reason this information is important is because, if a given shape is calculated to be located outside of its enclosing shape, that is a potentially valid outcome (in theory), but an event would never reach such a shape on the window, because, by the time the event system has resolved what areas of the window have events routed to them (and in what way), all such shapes would be clipped to within some parent layer context's boundaries.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
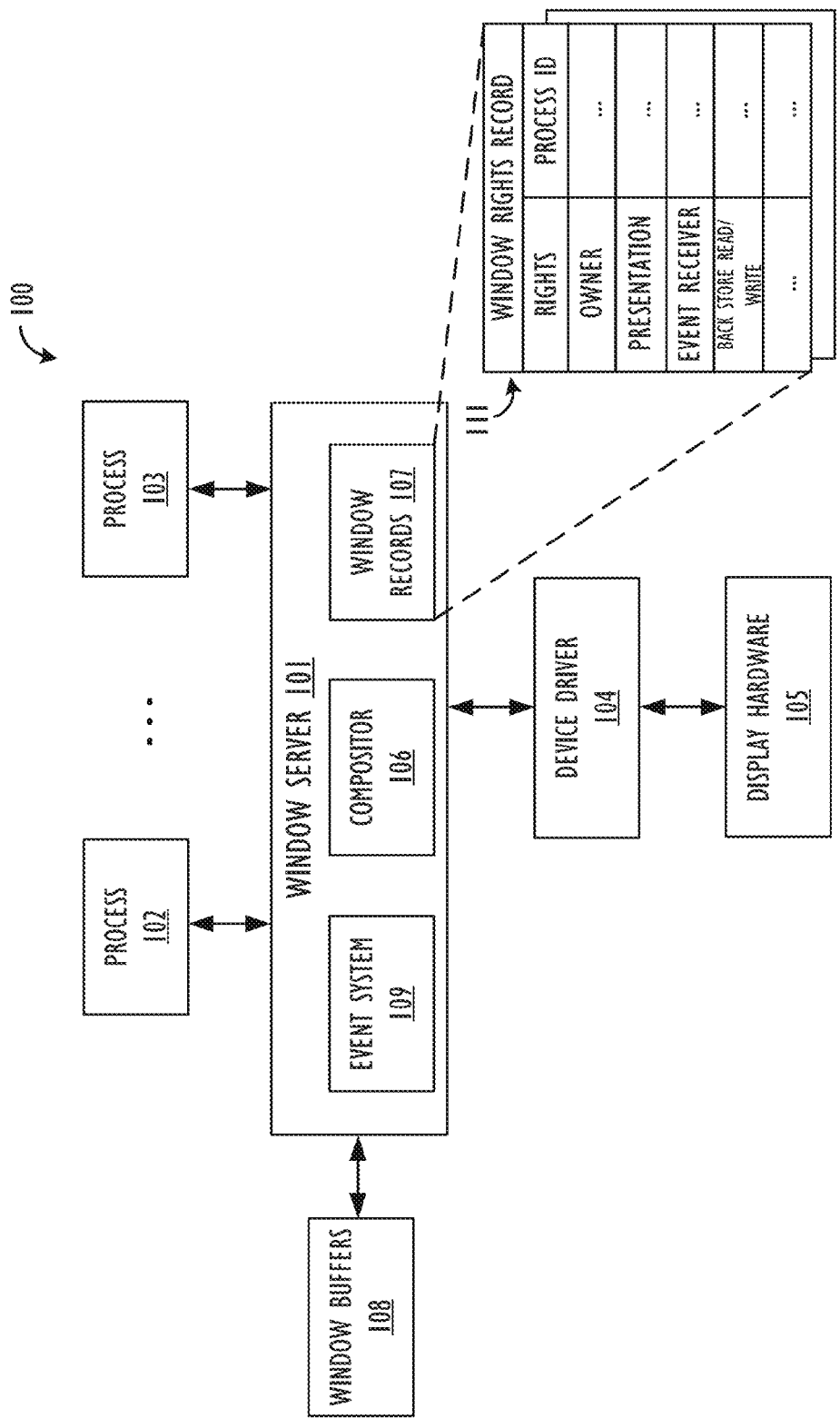
FIG. 1 is a block diagram illustrating a system architecture having a window server, in accordance with the prior art.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

According to some embodiments, a mechanism is employed by a window server to allow a first process (e.g., trusted process) as an owner of a window or other graphics context to grant one or more access rights (also simply referred to as rights) of the window or other graphics context to a second process (e.g., untrusted process) as a grantee that requests to access the window or other graphics context. The window server operates as a mediator to allow the first process and second process to negotiate the access rights to allow the second process to access a window or other graphics context owned, possessed, or created by the first process. Once the access rights have been negotiated between the first and second processes, the window server also operates as an enforcer to enforce the agreed upon access rights, which may limit access of the first process and/or second process to the window or other graphics context based on the negotiated access rights.

As a result, by delegating the granting authority to a process that owns the window or other graphics context, the window server does not have to handle the specific details of granting the access on behalf of an owner, where the owner is in a better position and knows the specific details of the window or other graphics context. In addition, the first process may trust the window server, as the window server may be part of an operating system, while the first process may be a certified application. However, the first process may not trust the second process, where the second process may be a third-party application installed in the system. By invoking the window server to mediate the granting of the access rights and to enforce the access rights, the security concerns between the first and second processes have been greatly reduced.

In prior art windows management systems, wherein access was only window-based, the so-called "handshaking" process of granting and accepting rights between processes wouldn't generalize to more granular levels of control because a given window couldn't grant new rights for a new sub-window. The present disclosure, which describes windows management systems and methods for managing authority designation and event handling for hierarchical graphical user interfaces including both windows and nested graphics contexts (e.g., CORE ANIMATION® layers), allows for more complex shapes within windows and more specialized event routing.

FIG. 1 is a block diagram illustrating a system architecture having a window server, according to prior art. Referring to FIG. 1, system 100 may represent any computing device such as a desktop, laptop, mobile phone, personal digital assistant (PDA), or a gaming device, etc. In one embodiment, system 100 includes, but is not limited to, one or more processes 102-103 communicatively coupled to window server 101 to render or display a window or GUI element on a display device via device driver 104 and display hardware 105. Processes 102-103 may represent any application or program that is executed by a processor (e.g., a microprocessor) in a memory (e.g., random access memory or RAM). Processes 102-103 may be executed in a user space or a kernel space of an operating system (OS), which may be any kind of operating systems, such as a Mac OS™ available from Apple Inc. of Cupertino, Calif., a Windows™ operating system available from Microsoft Corporation of Redmond, Wash., or other operating systems such as LINUX or UNIX, etc.

Window server 101 (also referred to as a window manager, window management system, or a graphics management system) is system software (e.g., a system component of an operating system) that controls the placement and appearance of windows (also referred to as graphical user interface elements) within a windowing system. Window server 101 is designed to help provide an operating environment, and it works in conjunction with the underlying graphical system (e.g., display device driver 104 and display hardware 105) which provides required functionality such as support for graphics hardware, pointing devices, and a keyboard. Typically, window server 101 controls access by the operating system and other applications (e.g., processes 102-103) to a display via device driver 104 and display hardware 105 (e.g., a display controller and/or frame buffers). For example, drawing may be clipped to an application's visible window. Window server 101 presents an interface to each client application that enables each client application to run without direct interaction with other applications on the machine.

In one embodiment, the window system as shown in FIG. 1 may be a buffered window system. In a buffered window system, application programs (e.g., processes 102-103) do not draw directly into a video memory, but to off-screen window buffers 108 in system memory that are then composed together by compositor 106 of window server to render the final screen. That is, instead of outputting directly to a common screen, application programs each output data first to a separate and independent window buffer (e.g., window buffers 108), where the data can be manipulated before they are transferred to a frame buffer (not shown) to be shown on a screen of a display device. The output from these separate window buffers is then processed and combined in the frame buffer to display onto a common screen of the display device.

A frame buffer is typically under control of graphics hardware 105 (e.g., a display controller) which controls the display of the windows on the screen of the display device using the data in the frame buffer. Thus, in a buffered window system, operations for creating the content in windows are separated from operations for composing a screen image from images of windows for different applications. Processes 102-103 create (or update) images of the windows (content for the windows) in window buffers 108; and compositor 106 of window server 101 composes a screen image from images of the windows in window buffers 108. Window buffers 108 are independent from the frame buffer. Content in the corresponding window buffers 108 can be copied by window server 101 and/or display device driver 104 to the corresponding locations in the frame buffer to display the windows in these locations on the common screen of the display device. The window buffers 108 are independent from the frame buffer.

According to one embodiment of a prior art "handshake" process, a mechanism is employed by window server 101 to allow a first process (e.g., process 102) as an owner of a window to grant or assign one or more access rights of the window to a second process (e.g., process 103) as a grantee or assignee that requests to access the window. Typically, the second process does not have privilege to access a window, and the second process has to rely on the first process to obtain the access rights to the window owned by the first process. For example, the first process may be a trusted process that is responsible for display a dialog box to allow a user to select a file from a file system. The second process may be a network related application that only has privilege to access a network, but it does not have privilege to access the file system. However, the first process may not trust the second process for the purpose of granting one or more access rights to a window owned by the first process. In this situation, the first process can only trust the window server.

In one embodiment, window server 101 operates as a mediator or bridge to allow the first process and second process to negotiate the access rights to allow the second process to access a window owned by the first process. Once the access rights have been negotiated between the first and second processes, window server 101 also operates as an enforcer to enforce the agreed upon access rights, which may limit access of the second process to the window based on the negotiated access rights. Window server 101 may also comprise an event system 109 for receiving incoming user-level events (e.g., mouse-related events) and routing them to the correct windows for handling.

According to one embodiment, for each window created by a process, window server 101 creates and maintains a window rights record 111 as part of window records 107. A window rights record 111 includes detailed information concerning the respective window, including certain access rights that are currently assigned to certain processes. Some of the accesses rights may be exclusive rights (e.g., owner, event receiver, presentation rights) which can only be assigned to a single process at a given time. Other accesses rights (e.g., back store rights) may be non-exclusive rights that can be substantially concurrently assigned to multiple processes. Window server 101 is configured to "oversee" the granting of the access rights from one process to another process or processes. For example, window server 101 may reject granting of any exclusive access rights to multiple processes.

In addition, when a first process attempts to grant an access right to a second process, window server 101 may also authenticate the first process to determine whether the first process has the authority to grant the access right. In one embodiment, only an owner of a window can grant an access right to another process that is not an owner of the window. In this example, if the second process obtains an access right from the first process and the second process attempts to grant the same access right to a third process, window server 101 may reject such an attempt. In one embodiment, window server 101 may maintain a list of ownerships of all windows managed by window server 101. Such information can be used to determine the ownership of a particular window, which can be used to determine whether a particular process has the authority to grant or assign an access right to another process.

Once the access rights have been granted and accepted, window server 101 is configured to enforce the access rights of a window according to its associated window record. That is, window server 101 may restrict a particular process to access only a portion of a window or a certain function of the window based on the access rights currently owned by that particular process. For example, if a process obtains an access right of a window to receive a mouse-up event (e.g., releasing a mouse button) without obtaining an access right to receive a mouse-down event (e.g., pressing a mouse button), window server 101 may allow the process to receive a notification when a mouse-up event occurs. However, the process would not receive a notification when a mouse-down event occurs. Thus, the access rights serve as an entitlement to access certain areas or functions of a window-and at the same time restrict a process from accessing other areas or functions of the window. This literally put a particular process in a restricted operating environment (e.g., a "sandboxed" environment) enforced by window server 101.

Referring back to FIG. 1, for the purpose of illustration, in response to a request received from process 102 for granting one or more access rights to process 103, window server 101 is configured to authenticate process 102 to ensure that process 102 has the authority to grant an access right. Window server 101 is further configured to examine the access rights to be granted, to create a window record reflecting the current states of the window. In one embodiment, a window record includes information identifying all or most of the access rights and the processes that hold the access rights. Thereafter, window server 101 transmits the information representing the window record to process 103 offering the access rights to be granted by process 102. Based on the information received from window server 101, process 103 can either accept or reject the offer. In one embodiment, process 103 can only accept or reject the entire offer. The offer may expire and become invalid after a predetermined period of time within which an acceptance has not been received by window server 101. Once the offer has been accepted by process 103, window server 101 is configured to enforce the access of the window by process 103 based on the accepted terms specified in the window record. In addition, if one or more exclusive rights have been granted to the process 103, access of process 102 associated with the exclusive rights may also be restricted by window server 101 (since process 102 no longer has those exclusive rights).

As a result, by delegating the granting authority to process 102 that owns the window, window server 101 does not have to handle the specific details of granting the access on behalf of an owner. In this situation, process 102 as an owner is in the best position to grant the access rights as typically the owner knows the specific details of the window. In addition, process 102 may trust window server 101, as window server 101 may be part of an operating system while process 102 may be a certified application. However, process 102 may not trust process 103, where process 103 may be a third-party application installed in system 100. By involving window server 101 to mediate the granting of the access rights and to enforce the access rights, process 102 does not have to worry about the authenticity of process 103.

According to some embodiments, an access right of a window includes one of an ownership right, presentation right, event receiving right, back store read right, back store write right, and some other rights. In one embodiment, an ownership right is an exclusive right, granting the sole ability to destroy the window, create right grants, and currently to change the nature of backing resources (such as the format of the backing store). All exclusive rights not explicitly held are implicitly held by the owner. A presentation right is an exclusive right, granting the ability to display a window visually as part of a process and manipulate the display characteristics (shape, position on screen, etc.). An event recipient right is an exclusive right, granting the ability to receive user events on the window. Mouse clicks and keyboard events routed to the window go to the holder of an event recipient right. Backing store access rights are both non-exclusive rights, granting the ability to read or write the memory backing the window's content. The ability to overwrite content has security implications as fake content can guide a user to perform actions they otherwise would not, and the ability to inspect content has security implications as it enables gathering of user information which a process would otherwise not have access to.

Figure 2:
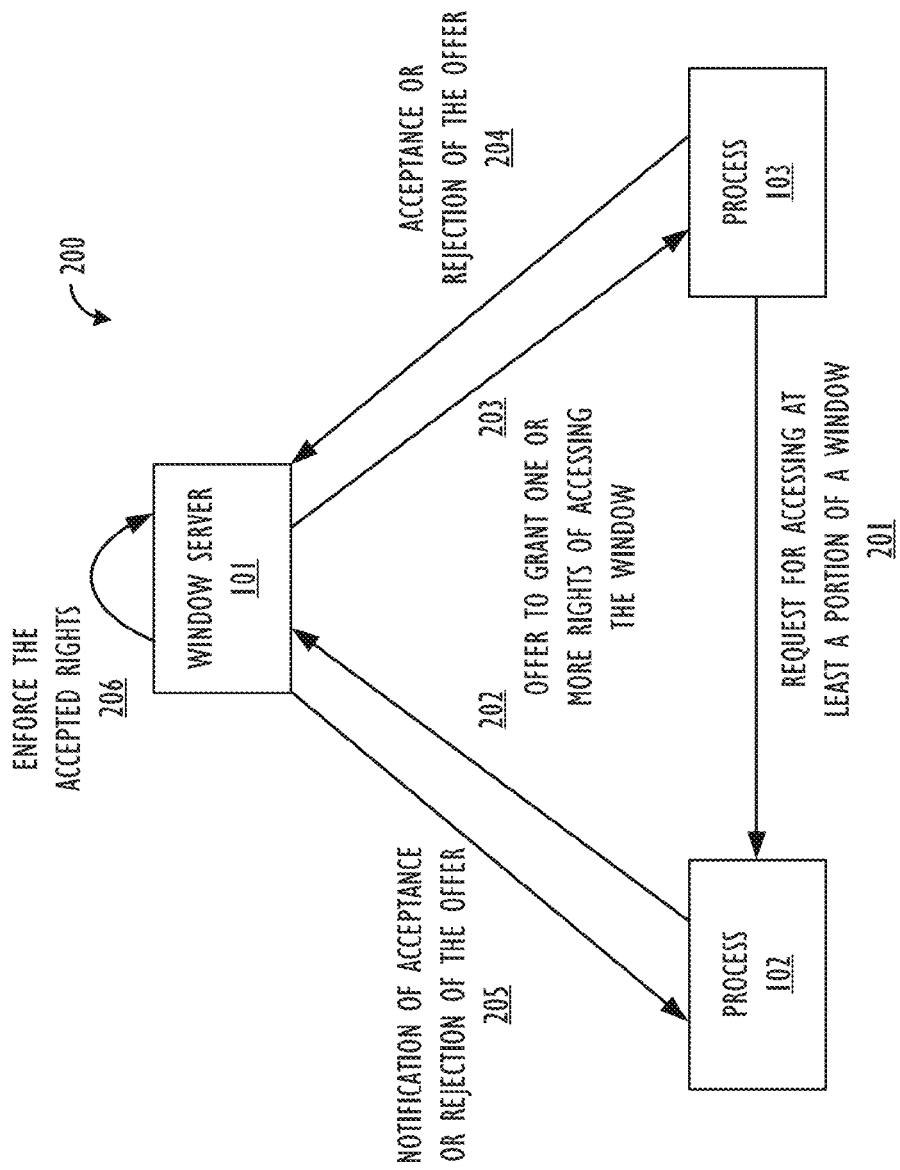
FIG. 2 illustrates is a process diagram illustrating a method for granting access rights of a window, in accordance with the prior art.

FIG. 2 is a process diagram illustrating a method for granting access rights of a window according to one embodiment of the invention. For example, process 200 may be performed by system 100 of FIG. 1. In this embodiment, it is assumed that process 103 does not have privilege to access a window and process 103 has to rely on process 102 to obtain the access rights to the window owned by process 102. For example, process 102 may be a trusted process that is responsible for display a dialog box to allow a user to select a file from a file system. Process 103 may be a network related application that only has privilege to access a network, but process 103 does not have privilege to access the file system. However, process 102 may not trust the process 103 for the purpose of granting one or more access rights to a window owned by process 102. In this situation, process 102 can only trust window server 101. For example, a plug-in may be housed in a separate process, and is unable to access the main window (e.g., the first process not trusting the third party code). A window could be granted to the plug-in which it could, for example, receive events from, and have backing store access, but the host process would keep the ownership and presentation rights so that the experience appeared as if the processes were not separated.

Referring to FIG. 2, initially during transaction 201, when process 103 requests accessing a window owned by process 102, process 103 transmits a first message to process 102, for example, via an inter-process call (IPC) or an application programming interface (API). The request may include information describing the window to be accessed including, for example, a window identifier (ID) identifying the window, a location or coordinates of at least a portion of the window being accessed, and one or more interactions with the window (e.g., event notifications to be received), etc. In addition, the request may further include a token or process or thread ID that uniquely identifies process 103 under window server 101. For the IPC between two processes prior to contacting the window server, a message or sequence of messages may be communicated between two processes. In one embodiment, a token to be passed to window server 101 to identify process 103, indicating what is being requested. This could be a window identifier, or it could be a description of a behavior/function (e.g., "I want window #213" vs. "I want a save panel"). In addition, a requested set of rights can be optional in this scenario, especially in the case of a description of behavior.

In response to the first message, during transaction 202, process 102 transmits, for example, via an API, a second message to window server 101. The second message includes one or more access rights to be offered to process 102 for accessing the window and a token or process ID associated with process 102. The one or more access rights may represent at least some of the interactions that process 103 can or cannot do with respect to the window. For example, an access right may determine whether a notification of a particular event (e.g., mouse-up or mouse-down event) will be sent and received by process 103. Some of these access rights may be exclusive rights that can only be possessed or held by a single process at a time or non-exclusive rights that can be shared by multiple processes. In addition, the second message may further include other access rights that are currently held by or assigned to other processes.

In response to the second message received from process 102, window server 101 authenticates process 102 to ensure that process 102 has the authority to grant the rights. In one embodiment, only an owner of a window can grant an access right of the window to another process. Window server 101 also authenticates process 103 based on the token or process ID of process 103. In addition, window server 101 generates a window record corresponding to the window ID obtained from the second message. The window record includes detailed information concerning at least some access rights of the window, including the access rights being offered to process 103. During transaction 203, window server 101 transmits a third message to process 103, where the third message includes at least the one or more access rights being offered. In one embodiment, if some of the access rights being offered include a non-exclusive right, the third message may further identify one or more other processes that share the non-exclusive right. In one embodiment, the third message may further include other access rights held by other processes (but not held by process 103). As a result, process 103 has an entire picture or full description of all the access rights associated with the window in determining whether to accept or reject the offer. In one embodiment, the offer may be good for a predetermined period of time, which may be set up by window server 101 (e.g., via a timer). When there is no acceptance received from process 103, the offer may expire and become invalid.

Based on the offer, during transaction 204, process 103 transmits a fourth message back to window server 101, either accepting the offer or rejecting the offer. During transaction 205, window server 101 transmits a fifth message to process 102 indicating whether the offer has been accepted, rejected, or expired. In one embodiment, window server 101 also sets up a timer with a predetermined timeout period and when the timeout period lapses, the offer may become invalid. When the offer has been rejected by process 103 or the offer becomes invalid, the corresponding window record may be updated (e.g., rolled back) or destroyed by window server 101 and without the corresponding window record, window server 101 prevents process 103 from accessing the window.

If the offer has been accepted by process 103, during transaction 206, window sever 101 is configured to enforce the accepted access rights when process 103 accesses the window. For example, process 103 may request to receive certain event notifications (e.g., mouse-up, mouse-down, resize, and/or focus events). Based on the request, process 102 may grant those access rights to receive such event notifications. During operations, when the associated interactions occur on the window, the corresponding event notifications will be transmitted (e.g., via a callback interface) from window server 101 to process 103, provided the corresponding window record indicates that such access rights are currently possessed by process 103. In addition, if an exclusive right has been granted from process 102 to process 103, the access of process 102 associated with the exclusive right may also be restricted by window server 101, as process 102 has given up that exclusive right.

Figure 3:
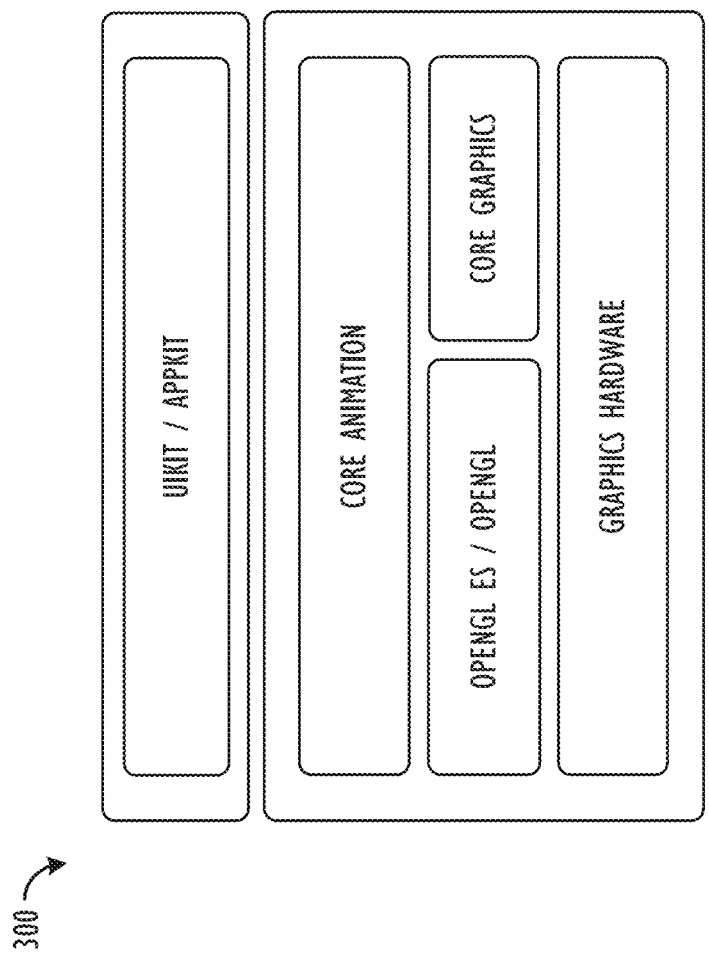
FIG. 3 is a block diagram illustrating an exemplary graphics rendering and animation infrastructure, in accordance with one embodiment.

Referring now to FIG. 3, a block diagram illustrating an exemplary graphics rendering and animation infrastructure 300 is shown. As shown in FIG. 3, the graphics rendering and animation infrastructure 300 includes a UIKit/AppKit, a CORE ANIMATION®, an OPENGL® ES / OPENGL®, Core graphics, and graphics hardware. Such a graphics rendering and animation infrastructure 300 may be utilized to manage process-external, reference-able content in an efficient fashion. The exemplary graphics rendering and animation infrastructure 300, CORE ANIMATION®, provided by Apple Inc., is a general purpose system for animating "views" and other visual elements of applications. (As used herein, a "view" refers to an NSView object, which defines the basic drawing, event-handling, and printing architecture of an application.) CORE ANIMATION® is a technology that integrates with views to provide better performance and support for animating view content. CORE ANIMATION® achieves this behavior by capturing content, e.g., by caching the contents of views into bitmaps that can be manipulated directly by the graphics hardware. In some cases, this caching behavior might require programmers to rethink how an application's content is presented and managed, but most of the time, the use of CORE ANIMATION® appears seamless to the programmer. In addition to caching view content, CORE ANIMATION® also defines a way to specify arbitrary visual content, integrate that content within views, and animate it along with everything else.

CORE ANIMATION® is not a drawing system itself. Instead, it is an infrastructure for compositing and manipulating an application's content in hardware. At the heart of this infrastructure are layer objects, which are used to manage and manipulate an application's content. A layer captures an application's content, e.g., in the form of a bitmap that may be manipulated easily by the graphics hardware. In most applications, layers are used as a way to manage the content of views, but standalone layers may also be created, depending on the needs of a particular application.

Layer objects are 2D surfaces organized in a 3D space, and are the elemental units of the CORE ANIMATION® infrastructure. Like views, layers manage information about the geometry, content, and visual attributes of their surfaces. Unlike views, layers do not define their own appearance. A layer merely manages the state information surrounding a bitmap or other content. The content itself can be the result of a view drawing itself or a fixed image that is specified. For this reason, the main layers used in an application are considered to be model objects because they primarily manage data. This notion is important for programmers to keep in mind because it affects the behavior of animations.

Most layers do not do any actual drawing in an application. Instead, a layer captures the content an application provides via drawing instructions, which may be cached in a bitmap or other format, sometimes referred to as the "backing store." When a property of the layer is subsequently changed, the corresponding state information associated with the layer object is changed. When a change triggers an animation, CORE ANIMATION® passes the layer's content and state information to the graphics hardware, which does the work of rendering the content using the new information.

Layers can be arranged hierarchically to create parent-child relationships. The arrangement of layers affects the visual content that they manage in a way that is similar to views. The hierarchy of a set of layers that are attached to views mirrors the corresponding view hierarchy. Standalone layers may also be added into a layer hierarchy to extend the visual content of an application beyond just the created views.

Figure 4:
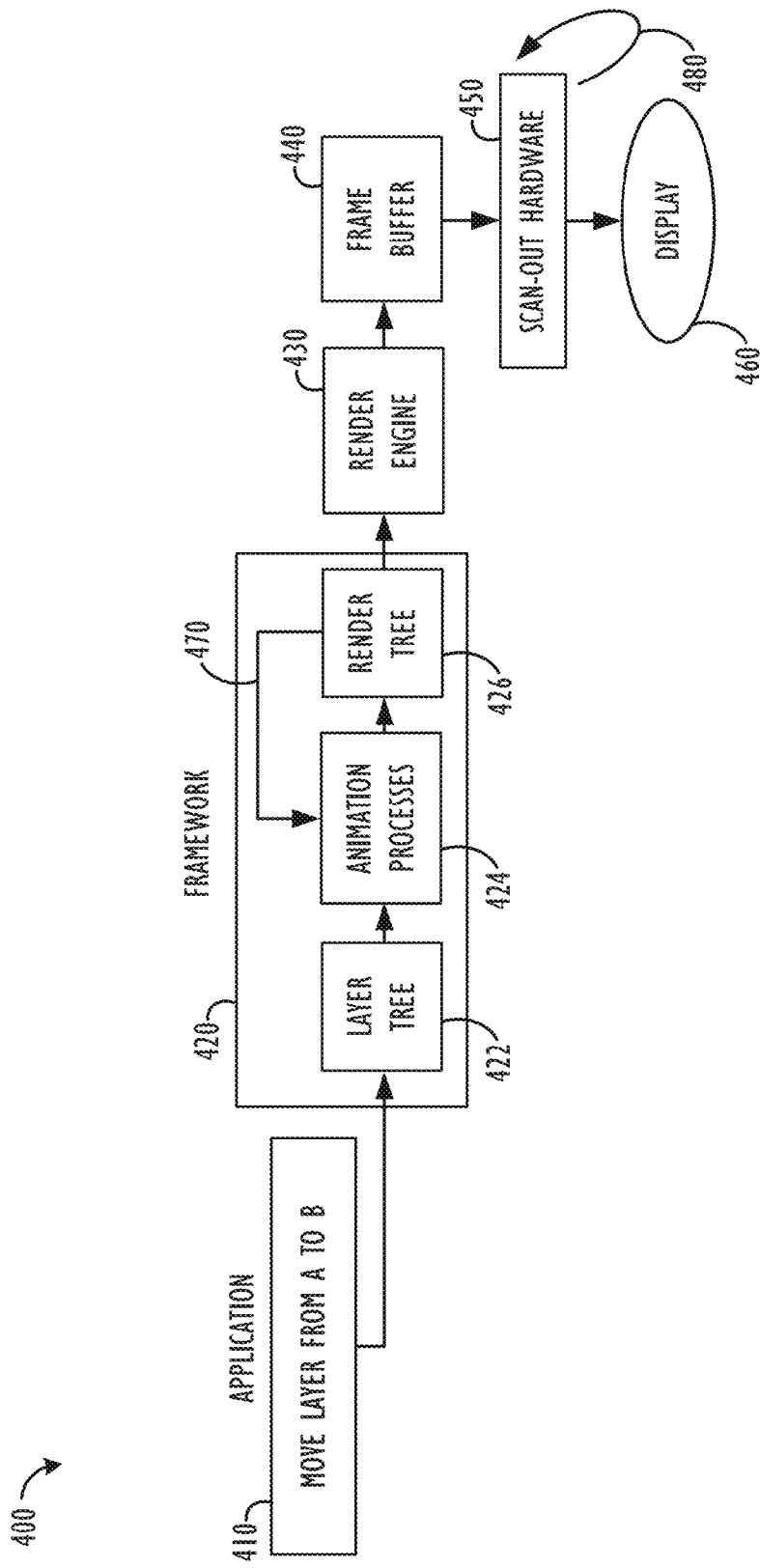
FIG. 4 illustrates an embodiment of a rendering process, in accordance with the prior art.

Referring now to FIG. 4, an embodiment of a rendering process is shown, in accordance with the prior art. In the rendering process 400, an application 410 inputs graphical user interface (GUI) information into a backing store (not shown), and a CORE ANIMATION® framework 420 (sometimes referred to herein simply as CORE ANIMATION®) is used to process the GUI information in the backing store. Once the framework 420 has processed the GUI information, a render engine 430 renders the processed information into a frame buffer 440. Although not shown in FIG. 4, the render engine 430 typically renders processed information into an assembly buffer that is then composited into the appropriate location of the frame buffer 440. When compositing is completed, scan-out hardware 450 outputs the rendered information in the frame buffer 440 to a display 460 using a frame rate 480 of the display 460.

The processing performed by the CORE ANIMATION® framework 420 includes graphics animation and compositing operations for the application 410. To perform the operations, the CORE ANIMATION® framework 420 divides the processing into a layer tree 422 and a render tree 426. A layer tree is simply a description of the content within a context, so a layer (and especially a layer hierarchy) specifies content, while a context represents ownership and drawing of this content. In this two-tree approach, the layer tree 422 is exposed to the application 410 and is used for implicit animation and implicit layout of graphics objects (also referred to herein as layers). On the other hand, the render tree 426 is manipulated and is traversed by the render engine 430.

The layer tree 422 includes a data structure that interfaces with the application 410. The data structure of the layer tree 422 is configured to hold a hierarchy of layers. The layers are objects having various properties and attributes and are used to build the GUI of the application 410. (The terms "property" and "attribute" may be used interchangeably in the present disclosure). In general, for example, the layers can include content, windows, views, video, images, text, media, etc. The data structure of the layer tree 422 is preferably as small and compact as possible. Therefore, many of the attributes of the layers preferably have default values kept in an extended property dictionary, such as NSDictionary of Apple's Cocoa application environment.

During operation, the application 410 interacts with the layer tree 422 of the framework 420 to manipulate the hierarchy of layers in the layer tree 422. The application 410 can be any computer application or client process that manipulates or changes the layers being displayed. When the application 410 commits an event or change to the layer tree 422, the framework 420 determines what events or changes are made at each layer by the application 410. These events or changes in the layer tree 422 are then committed to an animation and compositing process 424 of the framework 420. This process 424 determines one or more implicit animation functions of the framework 420 to use on the layer tree 422 based on the committed events or changes for each layer of the layer tree 422.

The animation and compositing process 424 then performs explicit animation of the events or changes and configures the layout of the layers in the render tree 426. The animation and layout of the render tree 426 is then rendered by the render engine 430 and output to the frame buffer 440. Any manipulations of layers made by the application 410 to the layer tree 422 are not evaluated at the frame rate 480 of the display 460. Instead, changes in the render tree 426 are traversed and updated at the frame rate 480.

As alluded to above, the framework 420 separates the animation and compositing of layers from the application 410. For example, when the application 410 makes changes, the affected layers in the layer tree 422 are instantly changed from one state to another. State changes reflected in the layers of the layer tree 422 are then "percolated" to the physical display 460 by animating the changes and compositing the layers of the render tree 426 from the initial state of the layers to their final or end-state. This form of animation and composition is referred to herein as "implicit animation" and is part of the animation and compositing process 424 of FIG. 4.

By using implicit animation in the framework 420, the application 410 does not have to include code for animating changes (e.g., movement, resizing, etc.) of layers to be displayed. Accordingly, any code required for animating layers can be minimized in the application 410. As shown in simplified form in FIG. 4, for example, the application 410 may not require an embedded loop for animating changes to the layers. Instead, the application 410 includes code that indicates a change in the state of a layer (e.g., indicates a change in position of a layer). The framework 420 determines from the changes made to the layers in the layer tree 422 what implicit animation to perform on the layers, and then the framework 420 explicitly performs that animation on the layers using the render tree 426. Accordingly, animations can be abstracted in such a way that the code of the application 410 does not need to run at the frame rate 480. This allows the animation for objects/layers to be decoupled from the logic of the application 410 and allows the application 410 and the animations to run on separate threads in the rendering process 400.

The animation and compositing process 424 can perform a number of different types of animation on layers or objects. For example, if the application 410 operates on the layer tree 422 to change a layer from start point A to end point B in the GUI for the application 410, the animation and compositing process 424 automatically manipulates (i.e., without application 410 input) the representation of that layer in the render tree 426 to animate its movement from point A to point B on the display 460. In another, example, if the application 410 operates on the layer tree 422 to add a new layer to the layer tree 422, the animation and compositing process 424 may automatically manipulate the render tree 426 to fade in the new layer. In yet another example, if the application 410 operates on the layer tree 422 to replace an existing layer with a new layer, the animation and compositing process 424 automatically manipulates the render tree 426 to animate a transition from the existing layer to the new layer.

Figure 5A:
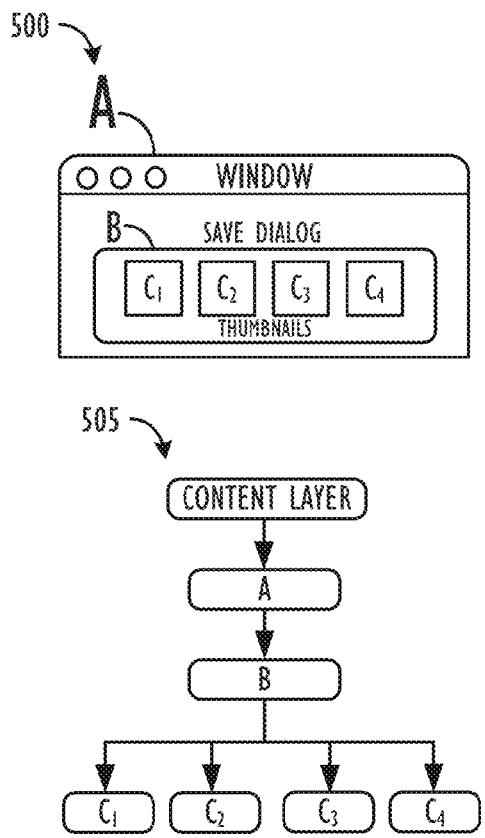
FIGS. 5A through 5C illustrate details of layers for a graphics rendering framework.

FIG. 5A shows an example of a window 500 of a graphical user interface. The window 500 has three layers A, B, and C. As described in the Save Dialog example outlined above, layer A represents a Host Application A that may request information to be put into a region of a window that will behave as a dialog box, e.g., Save Dialog B, and Save Dialog B may also needs to provide individual thumbnail images $C_1$-$C_4$. (Layer C is shown in FIG. 5A as being composed of four individual layers $C_1$-$C_4$. The fact that there are more than one Layer C is not important for the discussion here, since they are each arranged at the same level of the GUI hierarchy.) Much like the view hierarchy used in Apple Inc.'s NSView, the layers A, B, and C in the window 500 are linked together in a layer hierarchy 505, which is also shown in FIG. 5A. In general, each layer can have another layer as its superlayer and can be the superlayer for any number of sublayers. As used herein, a superlayer is the layer that is immediately above a given layer in the hierarchy 505, and a sublayer is the layer that is contained either wholly or partially by the superlayer. In the example of FIG. 5A, the window's content layer is at the top of the hierarchy 505, and layer A in the hierarchy 505 is the superlayer for sublayer B, while layer B is the superlayer for sublayers C.

Figure 5C:
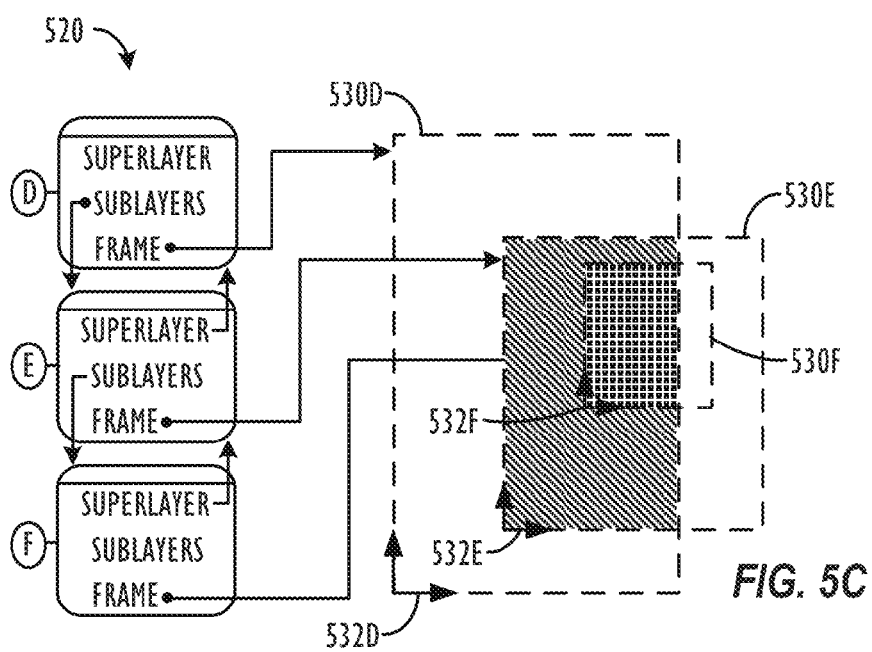
Figures 1, 5B:
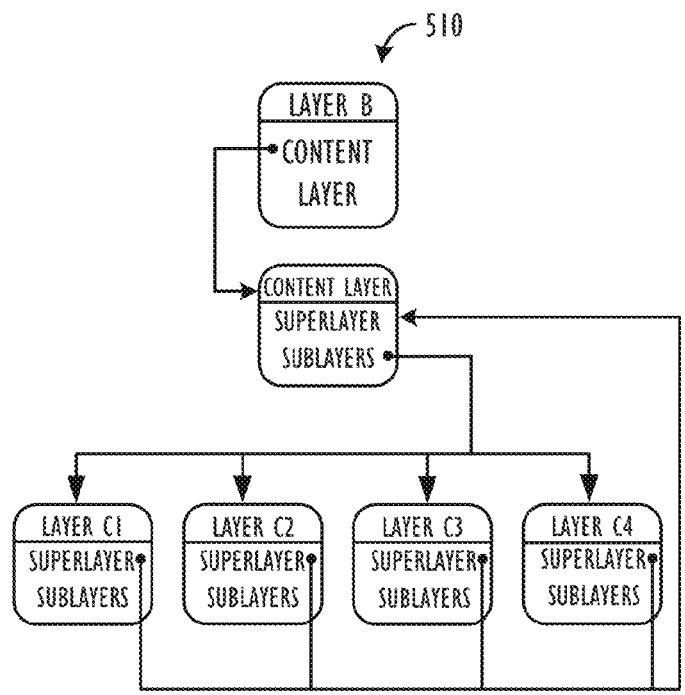
Figures 2, 5B:
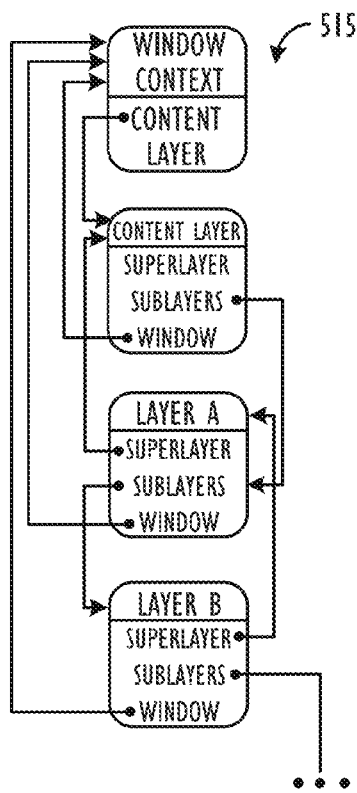

FIG. 5B-1 shows the hierarchical relationships 510 between the B and C layers in the layer hierarchy 505 of FIG. 5A. Using the relationships 510 for the layers is beneficial for both drawing and handling events for an application's GUI. In particular, the layer hierarchy 505 of FIG. 5A having the relationships 510 of FIG. 5B-1 permits more complex layers to be constructed out of other sublayers and allows each layer to have its own coordinate system. In particular, FIG. 5B-1 shows that an instance of a hostable context B has a content layer, which has sublayers $C_1$, $C_2$, $C_3$, and $C_4$. According to some embodiments, sublayers $C_1$, $C_2$, $C_3$, and $C_4$ may comprise context referencing layers. According to such embodiments, the sublayers may act as references to the corresponding contexts $C_1$, $C_2$, $C_3$, and $C_4$; that is, their content drawing commands instruct the Window/Content Server to place the content from the referenced contexts at their present locations. FIG. 5B-2 shows the hierarchical relationships 515 between the window and layers A and B in the layer hierarchy 505 of FIG. 5A. In particular, FIG. 5B-2 shows that the window context contains a layer A, which provides host-specified content and has a sublayer context referencing layer B. In this manner, the GUI may enforce a hierarchical authority designation and event handling scheme without the top-level window needing to know that particular composition or arrangement of its sublayers.

In FIG. 5C, for example, the relationships for three example layers 520D, 520E, and 520F are shown, where layer 520D is the superlayer of 520E and where layer 520E is the superlayer of 520F. Each layer 520D, 520E, and 520F is defined by a corresponding frame rectangle 530D, 530E, and 530F having its own coordinate system 532D, 532E, and 532F. The "bounds" attribute of the layers 520 defines its coordinate system 532. In general, the frame rectangle 530 of each layer 520 is positioned within the coordinate system 532 of its superlayer. Thus, the frame rectangle 530E for layer 520E is positioned within the coordinate system 532D of layer 520D, and the frame rectangle 530F for layer 520F is positioned within the coordinate system 532E of layer 520E. When a given layer 520 is moved or its coordinate system 532 is transformed (e.g., rotated, flipped, etc.), all of its sublayers 520 are moved or transformed along with it. Yet, because each layer 520 has its own coordinate system 532, the drawing instructions for that layer 520 can be consistent no matter where the layer 520 is or where its superlayer moves to on a screen.

The frame rectangles 530 essentially define the area of the layers 520-i.e., the tablet on which the layers 520 can draw. The frame rectangle 530 of a given layer 520 can lie within the frame rectangle 530 of its superlayer. In addition, the frame rectangle 530 of a given layer 520 can extend outside its superlayer's frame rectangle 530. For example, the frame rectangle 530F lies entirely within the frame rectangle 530E of its superlayer 520E, but the frame rectangle 530E for superlayer 520E extends outside the frame rectangle 530D of its superlayer 520D. In contrast to "views" in NSView, the layers 520 can place content outside the frame of their parent layers.

Figure 6:
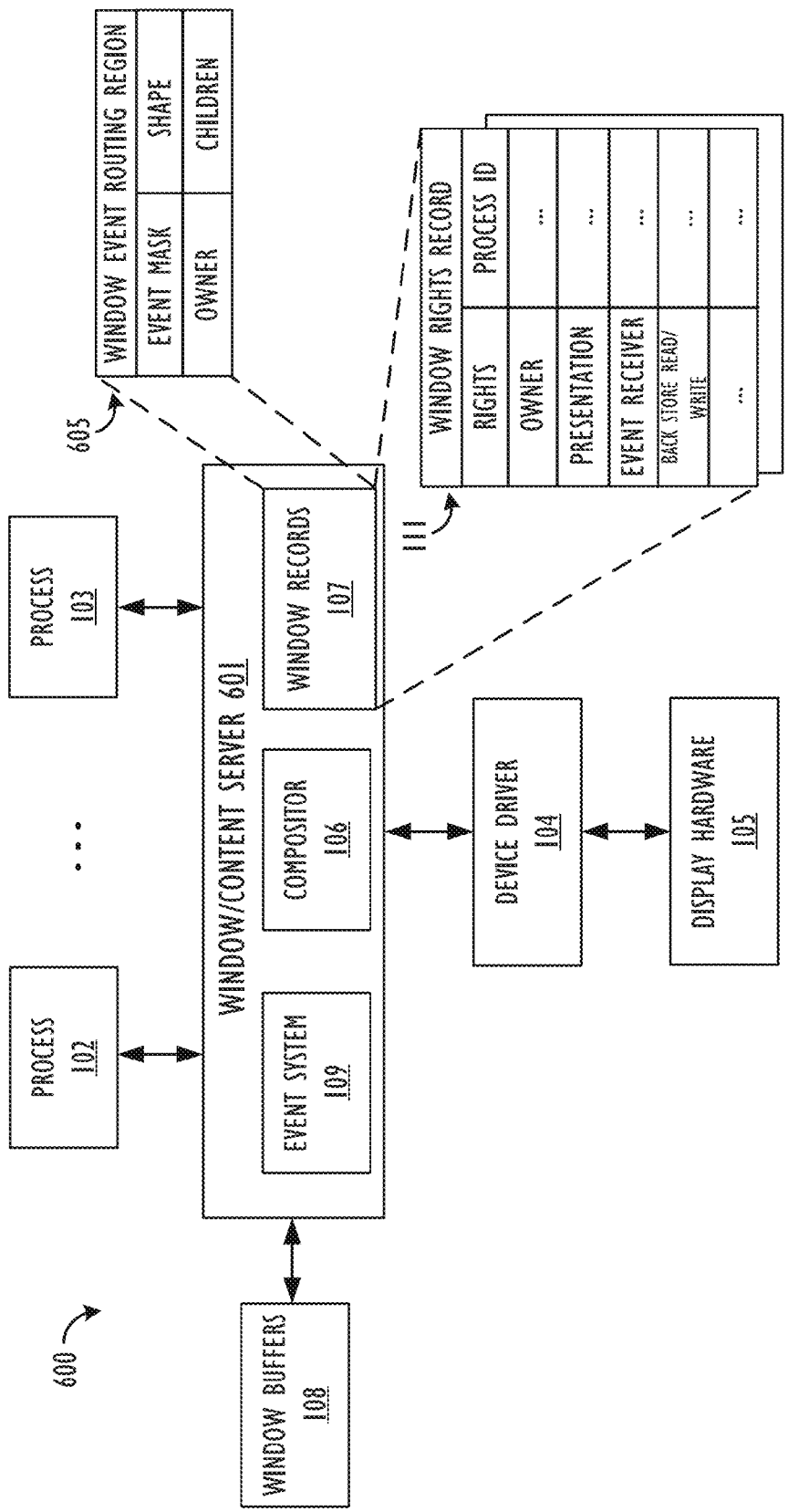
FIG. 6 is a block diagram illustrating a system architecture having a window and content server, in accordance with one embodiment.

Referring now to FIG. 6, a block diagram 600 is shown, illustrating a system architecture having a window and content server. Unlike the prior art system architecture shown in FIG. 1, FIG. 6 depicts a system wherein window server 101 has been replaced by Window/Content Server 601. As explained above, according to some embodiments, by hosting content in CORE ANIMATION® contexts—rather than in windows—the level at which the "handshaking" occurs is entirely within CORE ANIMATION®. So, an application may request a particular service to create a context for it to host, at which point CORE ANIMATION® will create the requested "window server hosted context" for the application.

As mentioned above, "window server hosted context" refers to a GUI content element, wherein the rendering doesn't happen in the client context; rather, it happens in the Window/Content Server 601. As such, any time a particular window needs to do a redraw, it has to synchronize the two (or more) processes that would need to be redrawn. Thus, by utilizing window server hosted contexts, the window manager may deal only with pre-synchronized data, since the CORE ANIMATION® content is committed in transactions and will always have the last committed transaction available to draw.

According to some embodiments, the "handshaking" process that takes place between contexts in CORE ANIMATION® may be stored in the form of a record specifying what contexts are allowed to host which content remotely. Thus, when CORE ANIMATION® attempts to perform the requested rendering, it can determine whether the "current" context is owned by the hosting process and whether it is expecting the hosted process. To this end, a window record may contain a Window Event Routing Region Record 605, i.e., the root of the Event Routing Region Tree for that window. A Window Event Routing Region Record 605 may include additional detailed information concerning the respective window or hosted context (i.e., information in addition to the information stored within window records 107 described with reference to FIG. 1), such as an event mask (as will be discussed in further detail below), shape specifying information, owner ID, and information specifying zero or more "Event Routing Region" children. Thus, the Window/Content Server 601 will look at the two context records in its records database and verify whether the requested context was the correct context and whether it was requested by the correct hosting context.

The "handshaking" process between remote contexts is dissimilar conceptually to the "handshaking" process described above with respect to windows, in that no intermediary extends an offer of rights. For example, first, a request has to be made by a first process for access to a particular context. With respect to the Save Dialog context example described above and with reference to FIGS. 5A-5C, there will be a request from an application that gets communicated in to the Window/Content Server 601. This transaction may take the following form: Step 1) The process that serves up the Save Dialog context receives a message specifying the following: "My Process ID is 'XYZ,' and I want a Save Dialog context that I can host."; Step 2) The process that serves up the Save Dialog context would then create a CORE ANIMATION® context and attach information about what process is expected to host it (and potentially other incidental info about how events should route) [The created Save Dialog context is referred to herein as a "hosted context" because it lives in the Window/Content Server 601, and the Window/Content Server 601 does the actual rendering of its content.]; Step 3) The process that serves up the Save Dialog will get an identifier for the created Save Dialog context that it can use to then craft the layout of the context, put content in it etc., and it will turn around and hand that identifier back to the context that requested it initially.

In the example presented above, the requesting process was Host Application A with Process ID 'XYZ,' the process that created the context was Save Dialog B, and the CORE ANIMATION® component in the Window/Content Server 601 knows that the Save Dialog context (with some given identifier) is owned by process B, and is restricted to being remotely added to process A. Then, when process A places a reference to this Save Dialog context in its Layer Tree, e.g., in the CORE ANIMATION® component of Window/Content Server 601, the context will be validated, i.e., the Window/Content Server 601 will confirm that the process that asked to put the reference to this particular context in its Layer Tree is the process that is allowed to do so. At that point, the "handshaking" process between remote contexts is complete. Thus, when the CORE ANIMATION® component in the Window/Content Server 601 renders the window from A, it would traverse A's the Layer Tree, see the remote context reference from B, validate whether B may be hosted in A, and then draw that content. As part of drawing that content, the Window/Content Server 601 would also see the remote context reference from C, and validate that the current context (i.e., B) was really from B, and render C, and then turn around and report both shapes (i.e., both the B shape in the A window and the C shape within the B shape). The process generalizes and would be repeated recursively for each hierarchical level of content in A's Layer Tree.

As may now be more clearly appreciated, when the content from B is added to the Layer Tree by A, A can restrict the area that B is allowed to be drawn in and move it around within the A's window. However, when a redraw happens that realizes a change in geometry in A, the shape of any area receiving an event also gets updated. In this manner, the way GUI elements are drawn and the way events are routed remain in sync with one another. Thus, even if the content and shape of B are drawn differently relative to window A's coordinate system, they remain in sync. When the window A redraws with a resizing change, for example, the event routing information gets updated at the same time, so that the window and its sub-region components behave as expected.

Figure 7:
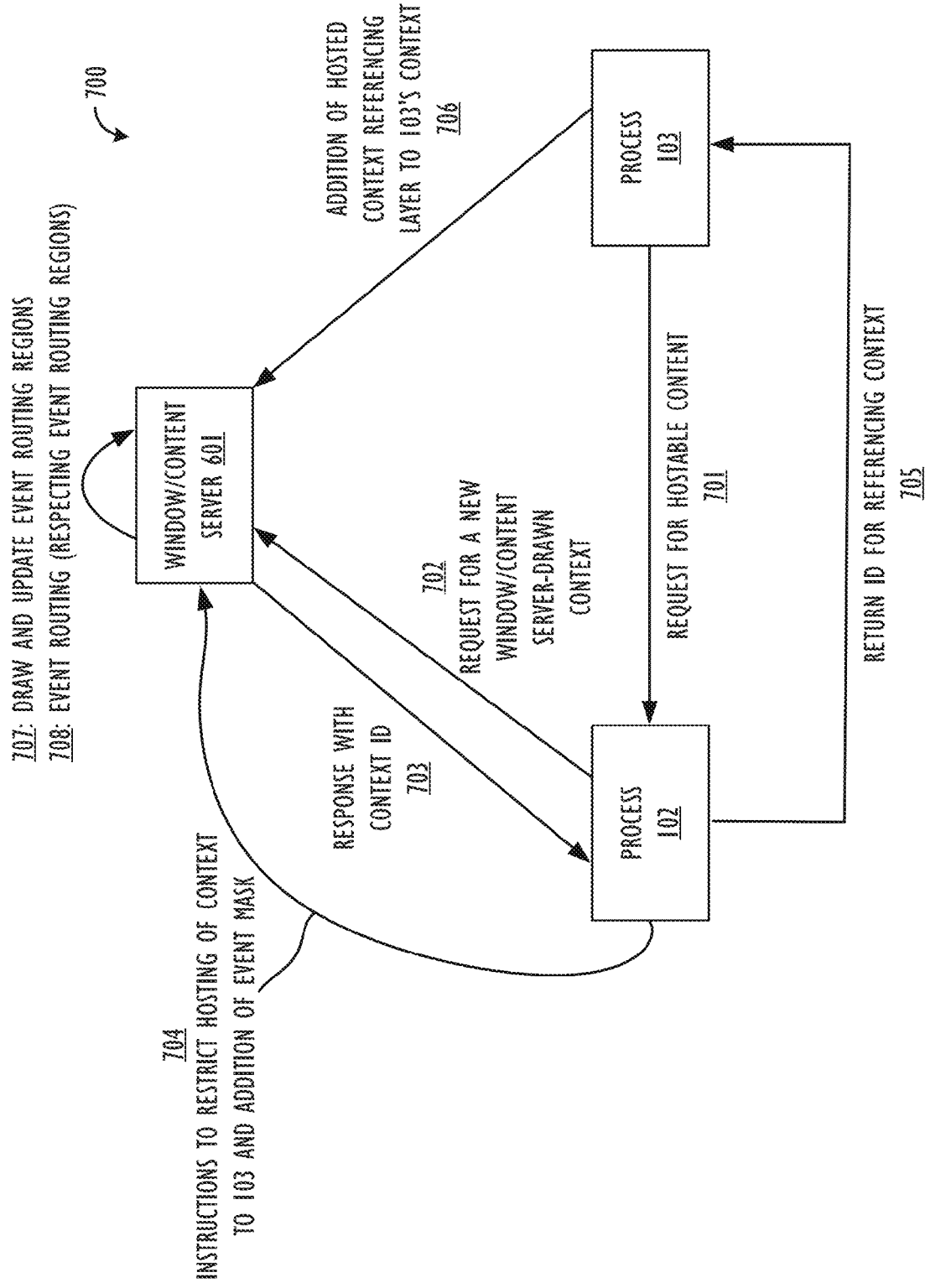
FIG. 7 is a process diagram illustrating a method for granting access rights of a window or hosted context, in accordance with one embodiment.

Referring now to FIG. 7, is a process diagram 700 is shown, illustrating a method for granting access rights of a window or hosted context. FIG. 7 reflects several improvements over the process diagram of FIG. 2 stemming from the use of CORE ANIMATION® contexts that are hosted within the Window/Content Server 601. In particular, the offer to grant one or more rights of access now takes place at the context-level, rather than the window-level. First, at Step 701, Process 103 may make a request for hostable content from Process 102. Process 102 may then communicate with the Window/Content Server 601 to make a request for a new context drawn by Window/Content Server 601 (Step 702). Upon receiving the response with the context identifier provided by the Window/Content Server 601 (Step 703), Process 102 may then instruct the Window/Content Server 601 to restrict the hosting of the context to Process 103 (Step 704). Process 102 may also pass along the relevant event mask for the created context (as will be explained in further detail below). Process 102 may then return an identifier for the referencing context to Process 103 (Step 705). Once Process 103 has received the context identifier, it may inform Window/Content Server 601 of the addition of the hosted context referencing layer to its context (Step 706). Finally, the Window/Content Server 601 may proceed to draw and update the various contexts within the hierarchical GUI according to the Event Routing Regions (Step 707), while continuing to route events according to the Event Routing Regions (step 708).

Specialized Event Routing

As mentioned above, when the authority designation process was purely window-based, the rights enforcement process couldn't generalize because windows couldn't grant new rights for a new sub-window. The new hosted context model described herein allows for more complex shapes and more specialized event routing.

According to some embodiments, event routing is implemented by using data structures referred to herein as "event masks." An "event mask" is a bit mask where the different bits represent event types. E.g., event type 1 may be "left mouse down" and event type 2 may be "left mouse up." Various event types may be represented by increasing binary values created by performing left shift operations on the preceding binary value. In this way, complex bit maps may be created with information specifying whether a particular window or context receives a particular type of event, and then such bit masks may be combined in a computationally efficient manner, e.g., using a logical OR operation, to determine whether any component within the hierarchy of a particular window receives an event of a particular type.

According to some embodiments, at a high-level, the process for handling incoming events begins by determining whether a window located under the position of the incoming event is interested in the event. Compared with prior art solutions, this determination now also considers potential sub-window routing of events within the shapes hosted inside the window. This results in a situation wherein a window may receive an event even if it has not declared interest in it. For example, if an event is clearly meant for the window performing the event routing analysis—and no other window is overriding the current window's interest in the receipt of the event—then the current window may receive the event. One example of such an event may be a "scroll event," which should go to the window under the mouse whether or not the window has declared an interest in scroll events.

The search for interested windows may now be generalized through the region hierarchy that gets attached to the windows. As explained above, when hosted contexts having particular shapes and locations (also referred to herein as "structural regions") are added to a window's Layer Tree, each structural region is treated as a node in the Layer Tree having: an arbitrary number of children listed in z-order; a parent identifier; and a shape. At the top level of the hierarchy is the window itself. The window will have its own event mask, which may be augmented with one or more "structural region event masks" to create an "effective event mask," i.e., an aggregation of the event masks of all the structural regions hosted within the window with the event mask of the window itself. In one embodiment, augmenting the window's event mask with the structural region event masks comprises performing a set union operation, e.g., a bitwise OR operation, on all the structural regions hosted within that window. In the Save Dialog example discussed throughout, the window's "effective event mask" would thus be: The event mask that A set on the window, bitwise OR'd with the masks for B and C. With the construction of the "effective event mask," the Window/Content Server 601 may now determine what event types any component of the window is interested in.

Event routing for windows may now be generalized into three groups: 1) Explicit Routing—the window under an event has explicitly declared interest in the event type; 2) Implicit Routing—the window under the event implicitly gets the event because of that event's type (if the events gets routed there); and 3) Opaque Window Routing—the widow does not get the event type and, if there are any windows under the current window, the event is not routed to them either. If none of the above conditions apply, the event is given to the first interested window (i.e., a window asking for the event and that can handle the event) below the current window. As may now be understood, some events may "drop" for a given window, e.g., if neither the window nor any of its component structural regions are interested in receiving the particular event type and there is no other interested window below the window.

Explicit Routing

If an event is explicitly routed into a window, the algorithm will attempt to determine the deepest member of the tree (i.e., the object with highest z-order) that explicitly wanted this event. To make this determination, at each level, the algorithm will evaluate whether the context wants the event and if the event is within its geometry. If so, it will check to see whether that context also has children that might want the event. In some implementations, the algorithm may actually operate by finding the deepest structural region at the location first, and then "walk" back up the hierarchy towards the window until finding the first structural region that explicitly wants the event. In other words, if a host window tries to put content over something that's provided remotely, the algorithm will continue routing to the remote context. This eliminates a potential security hole because, if the host window process could draw on top of what the remote content is, it could guide the user to send events that did something the user wasn't actually trying to do. Similarly, if the malicious process could receive the events, it could get information the user was trying to give to a process that was trusted. Thus, as may now be seen more clearly, it is a matter of security that event routing and visual content remain in sync at all times.

Implicit Routing

Even if there's a structural region that requested explicitly to get a particular event type, if the region is not in the linear list of deepest region at the location of the event, through its parents to the window, then nothing at that location has actually explicitly requested that event. Thus, the event should be routed implicitly. According to some embodiments, the event is routed implicitly based on the same rules for whether it went to the window, i.e., once it is known that a window is getting event, then the algorithm may do the search, starting at the deepest structural region, walking back up the hierarchy, and finding the first structural region that wants the event. If that search comes back with no interested region, then the event may just be sent to the deepest structural region, because this is directly equivalent to the idea of sending the event to the window that is "on top."

Opaque Window Routing

For windows that are opaque to a given event type (i.e., the widow does not get the event type and, if there are any windows under the current window, the event is not routed to them either), the algorithm may simply be generalized by finding the first window that may possibly be able to receive the event type and then applying the rules for the cases discussed above. In other words, because the first step of determining whether a window wants an event has had consideration of the structural regions' locations "folded into" it, the algorithm may simply proceed from there. Once it has been determined which window (if any) the event will go to, the correct region of the window is located using the rules described above.

New Event Routing Rules

As discussed above, two new types of event routing have been introduced: Implicit Routing and Opaque Window Routing. Because of these new routing types, certain new routing rules have been developed to deal with particular event routing scenarios, as will be discussed further herein. For example, if a window is opaque for an event, and that event routes implicitly, the event is always sent to the top-most window that handles the event type. If the window is opaque, but the event doesn't route implicitly, the event will be dropped (i.e., no window under this window can get the event, and this window is not interested). A final interesting case involves the scenario wherein the window is not opaque for the event, but there's no window that actually requested the event type (although the event can implicitly route). In such a scenario, the event may still be routed to the top-most window (since it can route to it implicitly).

As also discussed above, the concept of "effective event masks" have been introduced to aggregate the event masks of all the structural regions hosted within the window with the event mask of the window itself. Certain considerations must be taken into consideration in the construction of the effective event mask. In particular, the event masks of the window's sub-regions must be included in the effective event mask, but they must be included conditionally at first. This is because, when first attempting to determine whether a window is interested in a particular event, a first pass of the algorithm will ask: "Is there a chance anything in this window wants the event?" (If the window's native mask and the aggregated mask of all the structural regions don't match on the incoming event type, then it is safe to assume that the window doesn't want the particular event type.) If the window does match on the event type, however, and the particular event type is within the native mask, then the window does want the event. However, if the event type is only in the aggregated mask of the structural regions, then the algorithm has to begin searching by location and determine whether the structural region matching the position of the incoming event wants this event. As may now be understood, if only a structural region within the window wants a particular event type, then, when determining if the window wants a given event of that type, the algorithm process has to check if the location of the event is within that structural region. This process then generalizes hierarchically for the entire window. For example, if C is the only structural region asking for a certain event type, then the aggregated structural region event mask at both A's level and B's level will reflect that something wants the event, but the algorithm will have to intersect the geometry of the structural region from B and C to determine which structural region was the one that actually wanted the event.

Figure 8:
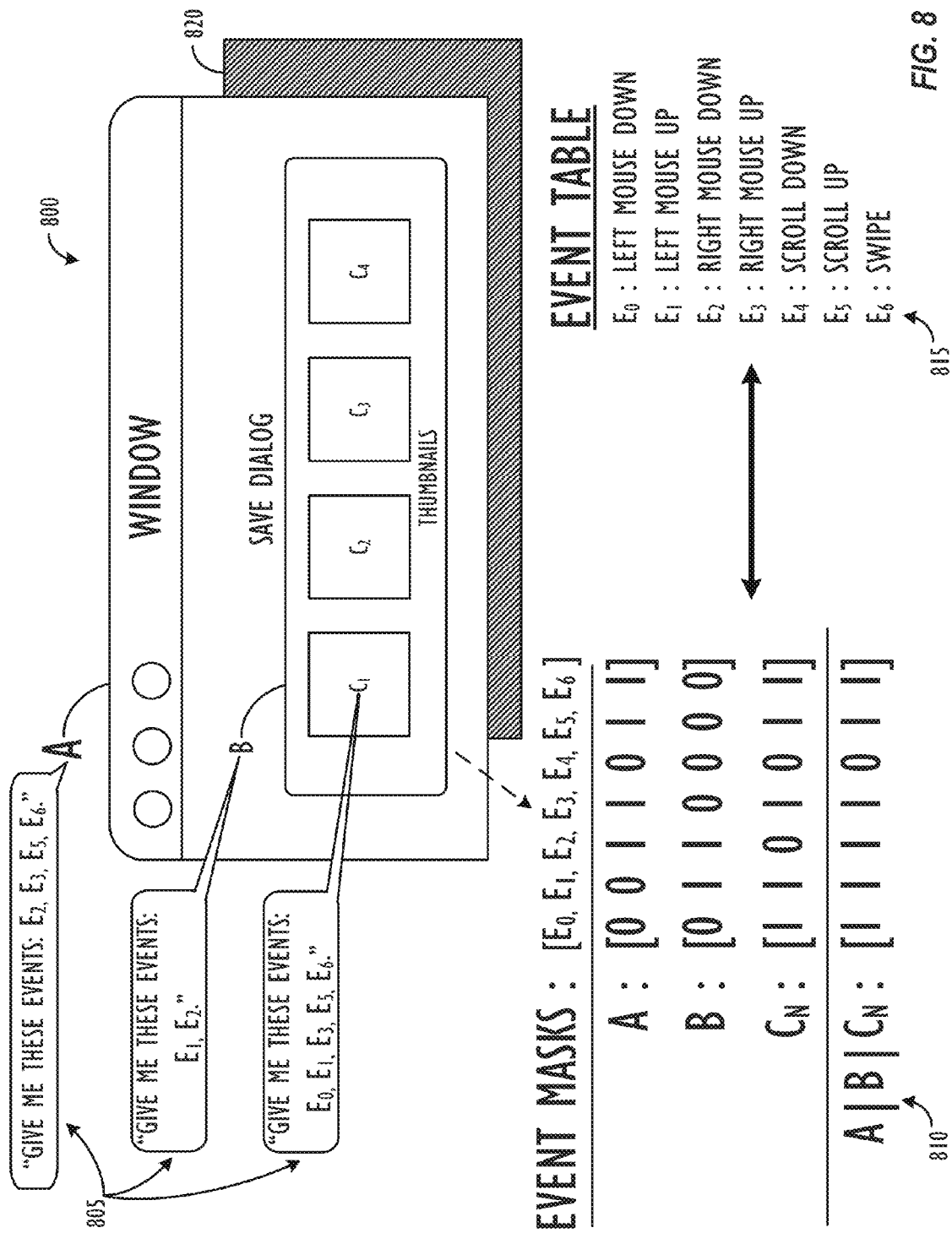
FIG. 8 is a diagram illustrating a method for handling event routing, in accordance with one embodiment.

Referring now to FIG. 8, a diagram 800 is shown, illustrating a method for handling event routing, in accordance with one embodiment. The exemplary scenario of FIG. 8 uses the same Save Dialog window example discussed previously and with reference to FIG. 5A. In this exemplary scenario, the different windows and component structural regions are requesting to receive events for different subsets of the possible events that the system is capable of responding to 805. In particular, Host Application A is requesting to receive event types: $E_2$, $E_3$, $E_5$, and $E_6$; Save Dialog B is requesting to receive event types: $E_1$ and $E_2$; and Thumbnails C are requesting to receive event types: $E_0$, $E_1$, $E_3$, $E_5$, and $E_6$.

The event masks for each of the components: A, B, and C, of the window are shown in Event Mask table 810. In particular, the effective event mask for the window is shown on the bottom row with the label: "A|B|$C_N$," to reflect the fact that this effective bit mask represents a bit-wise OR operation on the event masks for window A and structural regions B and C. As may be seen, at the location of structural regions of type C, each of the event types $E_0$-$E_6$ are requested by the window, other than event type $E_4$ (as reflected by the '0' at index position 4 in the effective event mask). Event Table 815 provides an exemplary cross-reference table, showing what events the various indices in the effective event mask correspond to. For example, event type $E_0$ corresponds to a left mouse down event; event type $E_1$ corresponds to a left mouse up event, etc.

Shaded window 820 represents a window that is "behind" the window of Host Application A in z-ordering. As discussed above with reference to Opaque Window Routing, if the window for Host Application A was "opaque" to event type $E_4$, an event of type $E_4$ located within the extent of the window for Host Application A would not be passed to shaded window 820—even if shaded window 820 (or some structural region within it) had declared an explicit interest in events of type $E_4$. If, on the other hand, Host Application A was not "opaque" to event type $E_4$, an event of type $E_4$ located within the extent of the window for Host Application A would be passed to shaded window 820 and the event would be given to appropriate structural region of the first window below the window for Host Application A that was both asking for events of type $E_4$ and which could handle events of type $E_4$.

Figure 9:
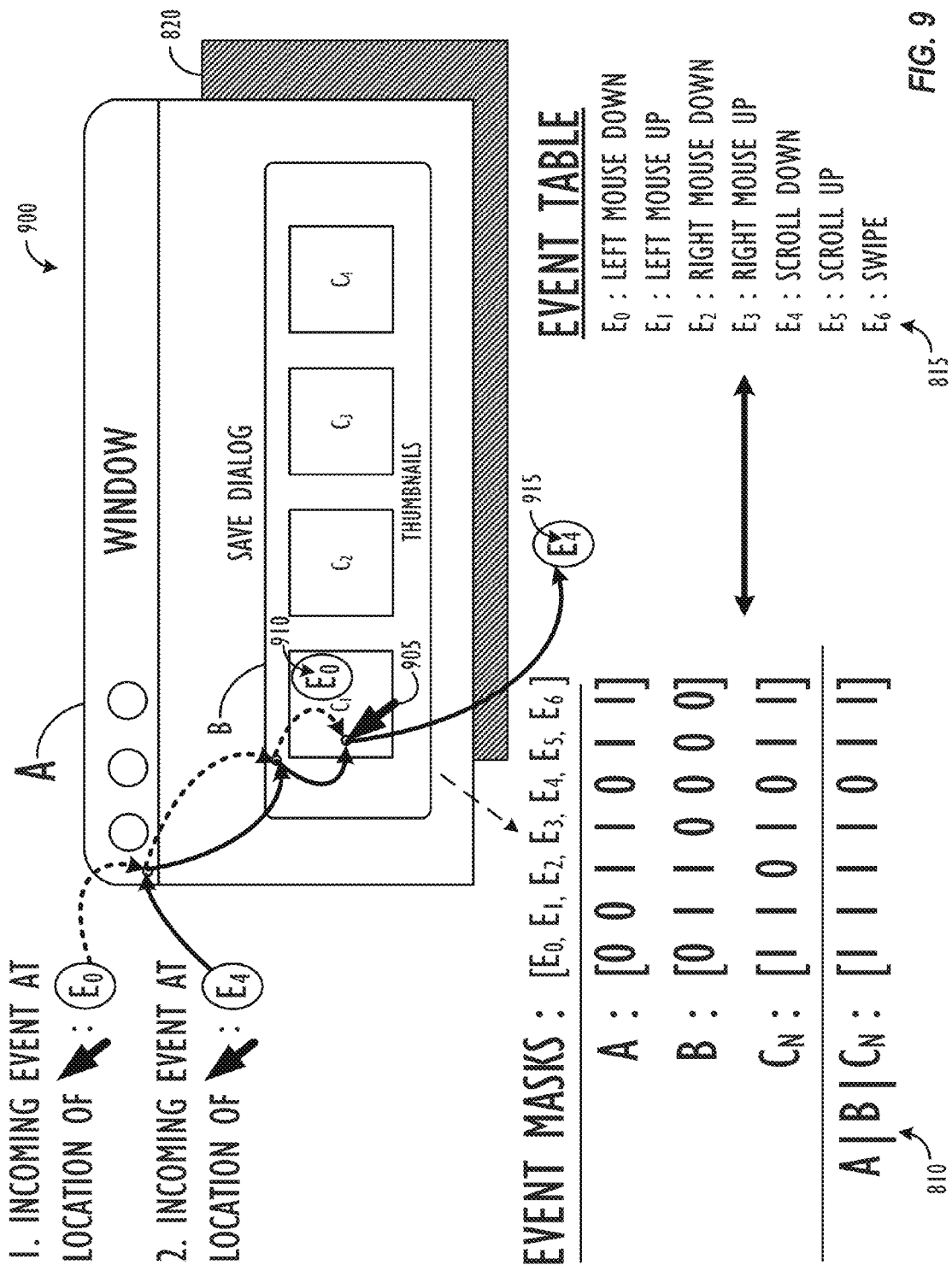
FIG. 9 is a diagram illustrating a method for handling event routing, in accordance with one embodiment.

Referring now to FIG. 9, a diagram 900 is shown, illustrating a method for handling event routing, in accordance with one embodiment. FIG. 9 specifically shows how the window in the exemplary scenario of FIG. 8 would handle incoming events of two types: $E_0$ and $E_4$. In this example, the location of the user's mouse is represented by mouse pointer 905, which is shown as being located over structural region $C_1$.

First, the behavior of the event routing algorithm will be examined with respect to an incoming event of type $E_0$ at the location of mouse pointer 905. As represented by the dashed arrow lines, the algorithm will first determine if window A is interested in receiving events of type $E_0$. As may be seen, the event mask for window A has a '0' in its event mask at the index position corresponding to event $E_0$, so the process may proceed to evaluate structural region B's interest in receiving events of type $E_0$. As may be seen, the event mask for region B also has a '0' in its event mask at the index position corresponding to event $E_0$, so the process may proceed to evaluate structural region C's interest in receiving events of type $E_0$. The event mask for structural region C has a '1' in its event mask at the index position corresponding to event $E_0$, so the process may proceed to give the incoming $E_0$ event (in this case, a left mouse down event) to the structural region at the location of mouse pointer 905. In this case, that corresponds to the thumbnail image $C_1$. Passing of this left mouse down event to the thumbnail image $C_1$ may then trigger the appropriate response in the process that owns the thumbnail image $C_1$, such as giving Save Dialog process B the File_ID of the file that the user wishes to overwrite by saving the current file.

Next, the behavior of the event routing algorithm will be examined with respect to an incoming event of type $E_4$ at the location of mouse pointer 905. As represented by the solid arrow lines, the algorithm will first determine if window A is interested in receiving events of type $E_4$. As may be seen, the event mask for window A has a '0' in its event mask at the index position corresponding to event $E_4$, so the process may proceed to evaluate structural region B's interest in receiving events of type $E_4$. As may be seen, the event mask for region B also has a '0' in its event mask at the index position corresponding to event $E_4$, so the process may proceed to evaluate structural region C's interest in receiving events of type $E_4$. The event mask for structural region C also has a '0' in its event mask at the index position corresponding to event $E_4$. Because there are no deeper layers in the hierarchical representation of window A—assuming that events of type $E_4$ do not route implicitly—the process may proceed to give the incoming $E_4$ event (in this case, a scroll down event) to the first interested window (i.e., a window asking for the event and that can handle the event) below the window A. As mentioned above, assuming window A is "opaque" to events of type $E_4$, the event will simply be dropped and not passed to windows located underneath window A, even if they may have had interest in events of type $E_4$.

Figure 10:
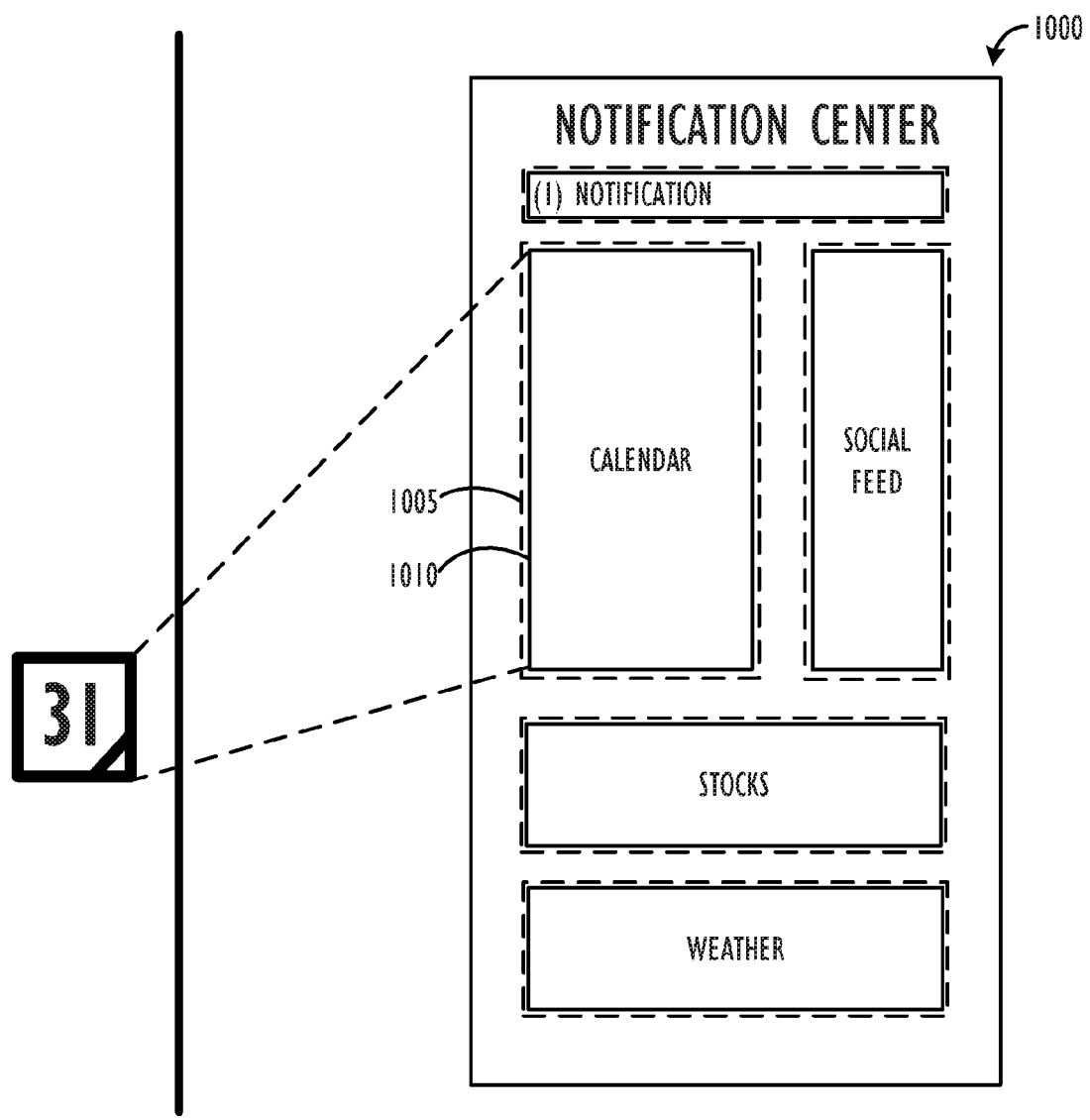
FIG. 10 is a block diagram illustrating a GUI for hosting content from sandboxed processes, in accordance with one embodiment.

FIG. 10 is a block diagram illustrating a GUI for hosting content from sandboxed processes 1000, in accordance with one embodiment. Sandboxed GUI system 1000 is labeled as "Notification Center" in FIG. 10. Notification Centers are common on today's desktop, laptop and/or mobile computing devices, and may provide users of such devices with a convenient graphical interface for viewing notifications from any number of system-level applications, user-installed applications, widgets, incoming communications, and the like. It will be understood that the use of "Notification Center" construct in FIG. 10 is merely for exemplary purposes, and that the techniques of the current disclosure may be applied in a variety of contexts where secure management and routing of events in a hierarchical GUI structure is desired.

Each of the exemplary modules 1010 shown in FIG. 10 (e.g., Notifications, Calendar, Social Feed, Stocks, Weather) may be provided by to the Notification Center, but instead of being provided as plug-ins that are loaded into Notification Center directly (in which case each plug-in would have access to everything in the Notification Center process), according to some embodiments described herein, the various modules may instead be a "services" that are requested by the Notification Center. For example, the Notification Center may simply ask for a graphics context to be placed at a particular location 1005 within its extent that shows Stock information. This means that, e.g., if the user receives a Stock notification that needs to update the share prices of one of the stocks being monitored by the user, the event for that notification can be routed without the Notification Center having to know about it, and a preview of the updated stock price could be drawn without anything in the Notification Center's address space needing to know anything special about the Stocks client module. From the user's perspective, however, the relevant information will still be drawn at the correct location inside of the Notification Center.

In this instance, the service modules providing the content would be more sandboxed and less trusted. However, they are still able to draw their desired UI updates in the appropriate regions on the screen when they receive notifications. By using the techniques described herein, the service modules are nicely sandboxed, without the Notification Center application having to extend any extra trust to the service modules. In prior art implementations, plug-in modules, such as the service modules described above, have to be especially trusted. Further, the use of widgets requires the use of very restricted content (e.g., certain widgets may have to be web-based, or use a restricted subset of JavaScript to limit what they can do, etc.) and requires the content to be carefully extracted from the widgets before being presented to the user. Moreover, events may not be routed directly to widgets. Thus, widgets and plug-ins are examples of instances where the hosting application needs to know everything about the events that the widget and plug-ins receive and where the events will need to be routed. In some instances, plug-ins are actually loaded directly into a host process's address space. With the techniques described herein, the hosting application now no longer needs to know those details because event routing will be handled in a secure fashion by the improved Window/Content Server 601, e.g., following the event handling rules for windows and hierarchical structural regions outlined above.

Figure 11:
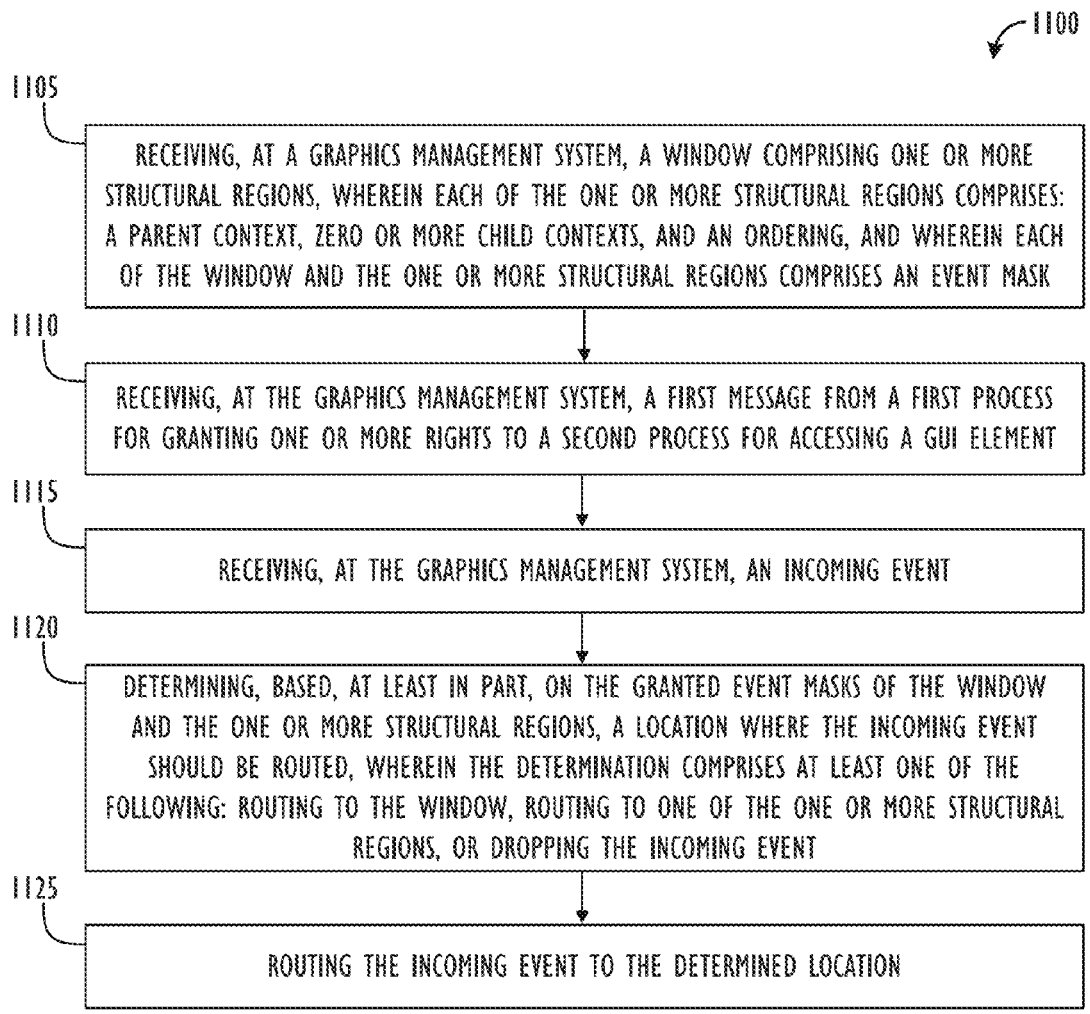
FIG. 11 is a flowchart illustrating a process for performing authority designation and event handling in a hierarchical GUI system, in accordance with one embodiment.

Turning now to FIG. 11, a flowchart is shown, illustrating a process 1100 for performing authority designation and event handling in a hierarchical GUI system, in accordance with one embodiment. First, the computer implemented method begins by receiving, at a graphics management system, a window comprising one or more structural regions, wherein each of the one or more structural regions comprises: a parent context, zero or more child contexts, and an ordering, and wherein each of the window and the one or more structural regions comprises an event mask (Step 1105). Next, the process proceeds by receiving, at the graphics management system, a first message from a first process for granting one or more rights to a second process for accessing a GUI element (Step 1110). Next, the process proceeds by receiving, at the graphics management system, an incoming event (Step 1115) and determining, based, at least in part, on the event masks of the window and the one or more structural regions, a location where the incoming event should be routed, wherein the determination comprises at least one of the following: routing to the window, routing to one of the one or more structural regions, routing to a different window, or dropping the incoming event (Step 1120). Finally, the process concludes by routing the incoming event to the determined location (Step 1125).

Figure 12:
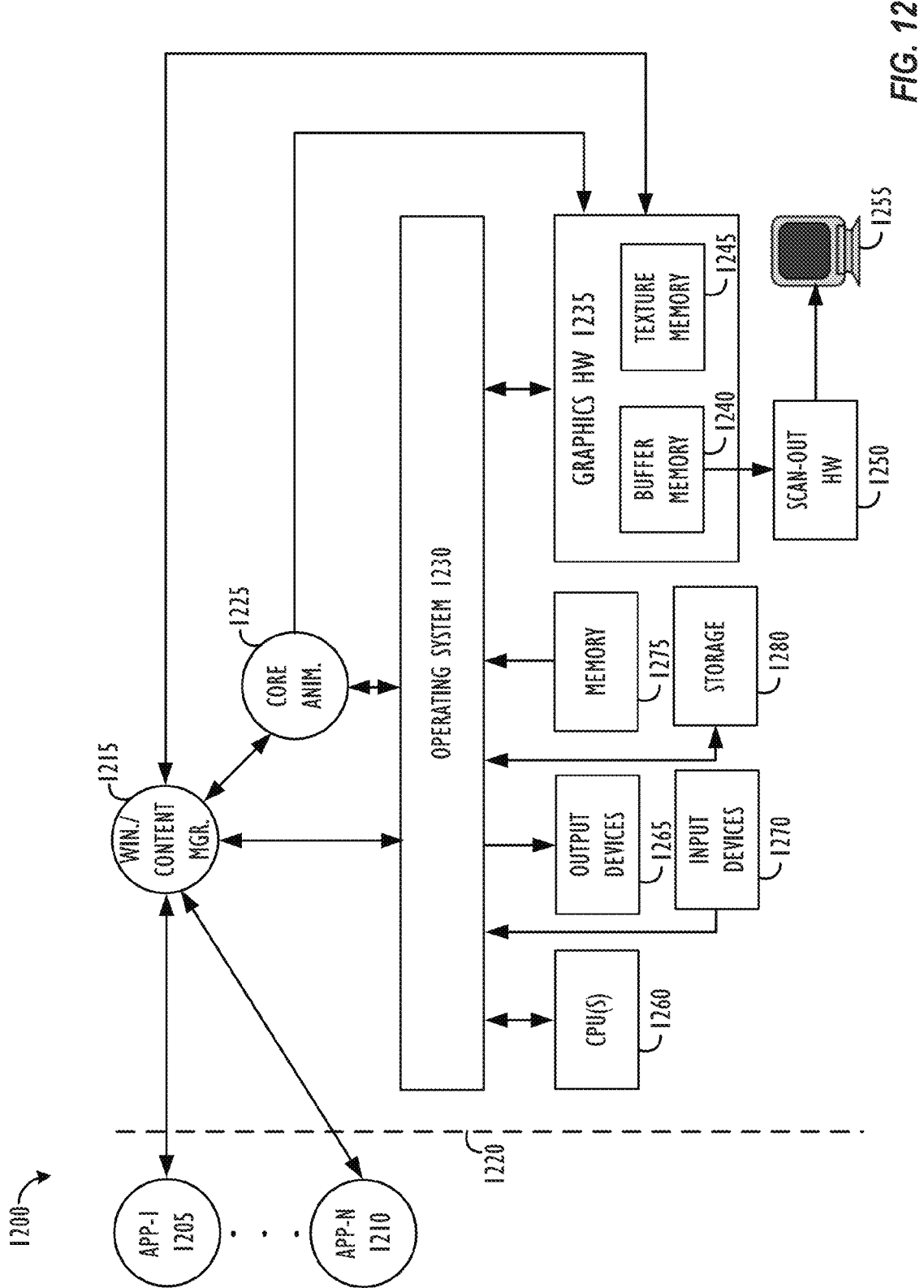
FIG. 12 is a block diagram illustrating a system that may implement window management operations, according to one embodiment.

Turning now to FIG. 12, illustrative computer system 1200 within which the disclosed window manager may be implemented is shown. Computer system 1200 includes one or more client applications (1205 and 1210) that communicate with Window/Content Manager 1215 through one or more application programming interface (API) libraries 1220. Applications 1205 and 1210 may, for example, include media players, web browsers, games, office software, databases, system utilities, etc. In one embodiment, applications 1205 and 1210 communicate with Window/Content Manager 1215 through an OpenGL API. As described above, Window/Content Manager 1215 may also communicate with a "second application" such as, for example, CORE ANIMATION® 1225. Both Window/Content Manager 1215 and CORE ANIMATION® 1225 may communicate with operating system 1230 and graphics hardware 1235 through one or more APIs such as OpenGL or Direct3D® (not shown). (DIRECT3D® is a registered trademark of the Microsoft Corporation.) Graphics hardware 1235 typically includes both working or buffer memory 1240 and texture memory 1245. Texture memory may be used to store texture maps so that they may be applied to the surfaces of graphical objects. Scan-out hardware 1250 takes the content of memory buffers (e.g., assembly or frame buffer memory)

and sends it to display device 1255 (e.g., a standard computer screen or a touch screen).

System 1200 is also shown to include one or more CPUs 1260, one or more output devices 1265, one or more input devices 1270, memory 1275, and storage 1280. CPUs 1260 may include any programmable control device including, without limitation, one or more members from: the Intel Core®, Intel Atom®, Pentium and Celeron® processor families. (INTEL CORE®, INTEL ATOM®, PENTIUM® and CELERON® are registered trademarks of the Intel Corporation.) CPUs 1260 may also be implemented as a custom designed circuit that may be embodied in hardware devices such as application specific integrated circuits (ASICs) and field programmable gate arrays (FPGAs). Output devices 1265 and input devices 1270 may provide audio, and/or visual and/or tactile based interfaces. Memory 1275 may include one or more different types of media (typically solid-state). For example, memory 1275 may include memory cache, read-only memory (ROM), and/or random access memory (RAM). Storage 1280 may store media (e.g., audio, image and video files), computer program instructions or software, preference information, device profile information, and any other suitable data. Storage 1280 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1275 and storage 1280 may be used to tangibly retain computer program instructions organized into one or more modules and written in any desired computer programming language. When executed by CPUs 1260 and/or graphics hardware 1235 such computer program code may implement one or more of the methods described herein.

While not shown, it will be understood that system 1200 may also include communication interfaces to enable communicate with other equipment via one or more networks (e.g., local networks such as a USB network, a business' local area network, or a wide area network such as the Internet). System 1200 may represent any number of computational platforms such as, without limitation, personal desktop computers, notebook computers, workstation computer systems, server computer systems, pad computer systems and other mobile platforms such as personal music and video devices and mobile telephones.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A computer-implemented method for managing graphical user interface (GUI) elements, the method comprising:
   receiving, at a graphics management system, a window comprising one or more structural regions, each of the one or more structural regions includes attributes indicative of a shape and a location of each corresponding structural region, wherein each of the window and the one or more structural regions comprises an event mask;
   receiving, at the graphics management system, an incoming event;
   determining an event type for the incoming event;
   comparing the event type with the event mask of the window and the event masks of the one or more structural regions;
   determining whether the incoming event should be routed to the window based on the comparison of the event type, wherein the determination comprises at least one of the following: determining the incoming event should be routed to the window, determining the incoming event should be routed to one of the one or more structural regions, determining the incoming event should be routed to a different window, or determining to drop the incoming event; and
   routing the incoming event based on the determination of whether the incoming event should be routed to the window.

2. The computer-implemented method of claim 1, further comprising:
   receiving, at the graphics management system, a first message from a first process, the first message granting one or more rights to a second process for accessing a GUI element; and
   creating a record associated with the GUI element within the graphics management system, the record including information indicating event routing information associated with the GUI element, wherein the record is used by the graphics management system to enforce the rights for accessing the GUI element by the second process.

3. The computer-implemented method of claim 2, wherein the record associated with the GUI element further includes information indicating an identity of zero or more child contexts referenced by the GUI element.

4. The computer-implemented method of claim 2, wherein the record associated with the GUI element further includes information indicating an event mask of the GUI element.

5. The computer-implemented method of claim 1, wherein determining further comprises determining a set union of the event masks of the window and the one or more structural regions.

6. The computer-implemented method of claim 1, further comprising receiving, at the graphics management system, a first message from a first process, the first message granting one or more rights to a second process for accessing a GUI element, wherein determining is further based on the one or more rights granted to the second process.

7. The computer-implemented method of claim 1, wherein the graphics management system represents a window server managing a plurality of windows and a plurality of contexts for a plurality of processes.

8. A graphics management system, comprising:
   a memory having, stored therein, computer program code; and
   one or more processing units operatively coupled to the memory and configured to execute instructions in the computer program code that cause the one or more processing units to:
   receive, at the graphics management system, a window comprising one or more structural regions, each of the one or more structural regions includes attributes indicative of a shape and a location of each corresponding structural region, wherein each of the window and the one or more structural regions comprises an event mask;

receive, at the graphics management system, an incoming event;

determine an event type for the incoming event;

compare the event type with the event mask of the window and the event masks of the one or more structural regions;

determine whether the incoming event should be routed to the window based on the comparison of the event type, wherein the determination comprises at least one of the following: determining the incoming event should be routed to the window, determining the incoming event should be routed to one of the one or more structural regions, determining the incoming event should be routed to a different window, or determining to drop dropping the incoming event; and route the incoming event to the determined location based on the determination of whether the incoming event should be routed to the window.

9. The graphics management system of claim 8, further comprising instructions in the computer program code that cause the one or more processing units to:

receive, at the graphics management system, a first message from a first process, the first message granting one or more rights to a second process for accessing a graphical user interface (GUI) element; and create a record associated with the GUI element within the graphics management system, the record including information indicating event routing information associated with the GUI element, wherein the record is used by the graphics management system to enforce the rights for accessing the GUI element by the second process.

10. The graphics management system of claim 9, wherein the record associated with the GUI element further includes information indicating an identity of zero or more child contexts referenced by the GUI element.

11. The graphics management system of claim 9, wherein the record associated with the GUI element further includes information indicating an event mask of the GUI element.

12. The graphics management system of claim 8, wherein the instructions in the computer program code that cause the one or more processing units to determine further comprise instructions in the computer program code that cause the one or more processing units to determine a set union of the event masks of the window and the one or more structural regions.

13. The graphics management system of claim 8, further comprising instructions in the computer program code that cause the one or more processing units to receive, at the graphics management system, a first message from a first process, the first message granting one or more rights to a second process for accessing a graphical user interface (GUI) element; and wherein the instructions in the computer program code that cause the one or more processing units to determine further comprise instructions in the computer program code that cause the one or more processing units to determine based on the one or more rights granted to the second process.

14. The graphics management system of claim 8, wherein the graphics management system represents a window server managing a plurality of windows and a plurality of contexts for a plurality of processes.

15. A non-transitory program storage device, readable by a programmable control device and comprising instructions stored thereon to cause one or more processing units to:

receive, at a graphics management system, a window comprising one or more structural regions, each of the one or more structural regions includes attributes indicative of a shape and a location of each corresponding structural region, wherein each of the window and the one or more structural regions comprises an event mask;

receive, at the graphics management system, an incoming event;

determine an event type for the incoming event;

compare the event type with the event mask of the window and the event masks of the one or more structural regions;

determine whether the incoming event should be routed to the window based on the comparison of the event type, wherein the determination comprises at least one of the following: determining the incoming event should be routed to the window, determining the incoming event should be routed to one of the one or more structural regions, determining the incoming event should be routed to a different window, or determining to drop the incoming event; and route the incoming event to the determined location.

16. The non-transitory program storage device of claim 15, further comprising instructions that cause the one or more processing units to:

receive, at the graphics management system, a first message from a first process, the first message granting one or more rights to a second process for accessing a graphical user interface (GUI) element; and create a record associated with the GUI element within the graphics management system, the record including information indicating event routing information associated with the GUI element, wherein the record is used by the graphics management system to enforce the rights for accessing the GUI element by the second process.

17. The non-transitory program storage device of claim 16, wherein the record associated with the GUI element further includes information indicating an identity of zero or more child contexts referenced by the GUI element.

18. The non-transitory program storage device of claim 16, wherein the record associated with the GUI element further includes information indicating an event mask of the GUI element.

19. The non-transitory program storage device of claim 15, wherein the instructions that cause the one or more processing units to determine further comprise instructions that cause the one or more processing units to compute a bitwise-OR of the event masks of the window and the one or more structural regions.

20. The non-transitory program storage device of claim 15, further comprising instructions that cause the one or more processing units to receive, at the graphics management system, a first message from a first process, the first message granting one or more rights to a second process for accessing a graphical user interface (GUI) element, wherein the instructions that cause the one or more processing units to determine further comprise instructions that cause the one or more processing units to determine based on the one or more rights granted to the second process.

* * * * *